United States Patent [19]

Clark, Jr. et al.

[11] Patent Number: 5,566,069

[45] Date of Patent: Oct. 15, 1996

[54] COMPUTER NETWORK FOR COLLECTING AND ANALYZING AGRONOMIC DATA

[75] Inventors: Louis G. Clark, Jr., St. Charles; Michael E. Corum, St. Louis; Donald R. Gummow, Jr., O'Fallon; Jeffrey L. McKune, Rolla; Marc Vanacht, St. Louis, all of Mo.

[73] Assignee: Monsanto Company, St. Louis, Mo.

[21] Appl. No.: 207,539

[22] Filed: Mar. 7, 1994

[51] Int. Cl.$^6$ .................................................. G06F 19/00
[52] U.S. Cl. ................................................................ 364/420
[58] Field of Search .................................. 364/420, 401, 364/403

[56] References Cited

U.S. PATENT DOCUMENTS

| | | |
|---|---|---|
| Re. 31,023 | 9/1982 | Hall, III . |
| 3,978,324 | 8/1976 | Rayner . |
| 4,015,366 | 4/1977 | Hall, III . |
| 4,176,395 | 11/1979 | Evelyn-Veere et al. . |
| 4,209,131 | 6/1980 | Barash et al. . |
| 4,244,022 | 1/1981 | Kendall . |
| 4,430,828 | 2/1984 | Oglevee et al. . |
| 4,463,706 | 8/1984 | Meister et al. ............... 119/51.02 |
| 4,493,290 | 1/1985 | Gibbard ....................... 119/51.02 |
| 4,617,876 | 10/1986 | Hayes ............................. 119/842 |
| 4,626,984 | 12/1986 | Unruh et al. . |
| 4,722,054 | 1/1988 | Yorozu et al. . |
| 4,745,550 | 5/1988 | Witkin et al. . |
| 4,755,942 | 7/1988 | Gardner et al. . |
| 4,760,547 | 7/1988 | Duxbury . |
| 4,851,999 | 7/1989 | Moriyama . |
| 4,931,932 | 6/1990 | Dalnekoff et al. . |
| 4,949,248 | 8/1990 | Caro . |
| 4,992,940 | 2/1991 | Dworkin . |
| 4,992,942 | 2/1991 | Bauerle et al. . |
| 5,023,787 | 6/1991 | Evelyn-Veere . |
| 5,063,505 | 11/1991 | Pate et al. . |
| 5,173,079 | 12/1992 | Gerrish ............................... 460/7 |
| 5,173,855 | 12/1992 | Nielsen et al. . |
| 5,246,164 | 9/1993 | McCann et al. ................. 239/11 |
| 5,327,708 | 7/1994 | Gerrish ............................... 56/1 |
| 5,379,057 | 1/1995 | Clough et al. ................. 345/173 |

*Primary Examiner*—Donald E. McElheny, Jr.
*Attorney, Agent, or Firm*—Gordon F. Sieckmann

[57] ABSTRACT

A client-client-server computer network includes a portable computer (client) connectable by a data link to a desktop computer (client) which transmits data through an offline batching data link to a host or system server (server) for the electronic collection, processing, and analyzing of agricultural data generated through the operation of a farm. A plurality of client-client computer sub-networks, one for each of a plurality of farms, is anticipated for connection through an offline, batching data link to a single system server such that a master data base may be assembled of data for many farms. Real time, same growing season, analyses and reports may be generated for use by any individual farmer from this master data base. The portable computer includes a nested display driven software for a graphic user interface computer, such as a Personal Digital Assistant, to simplify the data entry process. Various details of implementation include scrollable lists which have entries that are context sensitive to eliminate improbable or redundant or incorrect selections. The desktop computer includes a program for use on a Windows platform which closely emulates the graphic user inter-face provided by the portable computer such that a farmer need only become familiar with one computer program to fully operate the system. The offline batching data link, which may be a commercial messaging service, permits a single system server to efficiently communicate with many farmers without sacrificing significant amounts of system server processing time to input or output data.

55 Claims, 47 Drawing Sheets

Project Infoline

Preliminary screen flow diagram

Conventions - Scrolling lists

Conventions - Multi list selections
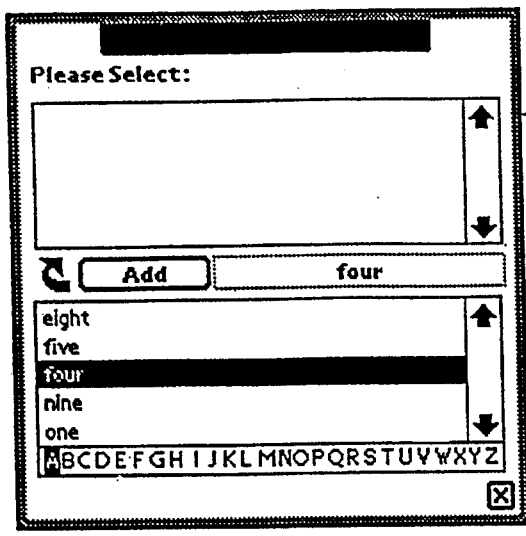
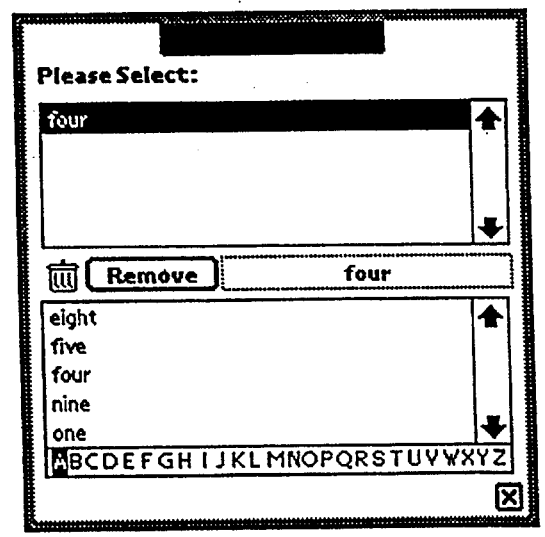
FIG. 6
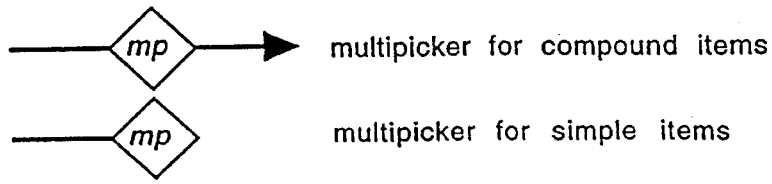

Conventions - Miscellaneous

FIG. 16

Crop Information

Selected Crop: Something

Field Name: _____  Year: _____

Total Area: _____ Acres

Timing/Crop Stage: _____

Area Planted: _____ Acres

Yield Goal: _____
♦ item 1

[ Cancel ]  [ Remove ]  [X]

Disease Scouting Information
Selected Disease: four # of affected plants per
    nn  ft.  nn  in.
(1/1000th Acre):

% Plant Injury:
◆ Severity: Severity 1

[Cancel] [Remove] [X]

Insect/Mite Scouting Information
Selected Insect/Mite: four # of Insects:
    nn  ft.  nn  in.
(1/1000th Acre):

# of Affected Plants:
    nn  ft.  nn  in.
(1/1000th Acre):

# of Insects Per Plant:
    nn  ft.  nn  in.
(1/1000th Acre):

◆ Severity: Severity 1

[Cancel] [Remove] [X]

Nematode Injury Scouting
Selected Nematode:

# of affected plants per
    nn  ft.  nn  in.
(1/1000th Acre):

◆ Severity: Severity 1

[Cancel] [Remove] [X]

Nutrient Deficiency Scouting
Selected Symptom: four

Deficiencies:
_____
_____
_____

◆ Severity: Severity 1

[Cancel] [Remove] [X]

Injury Scouting
Selected Injury: nine # of affected plants per
    nn  ft.  nn  in.
(1/1000th Acre):

% Plant Injury:
◆ Severity: Severity 1

[Cancel] [Remove] [X]

Weather Injury Scouting
Selected Weather Injury: four # of affected plants per
    nn  ft.  nn  in.
(1/1000th Acre):

% Plant Injury:
◆ Severity: Severity 1

[Cancel] [Remove] [X]

Weed Injury Scouting
Selected Weed: four # of weeds per
    nn  ft.  nn  in.
(1/1000th Acre):

◆ Severity: Severity 1

[Cancel] [Remove] [X]

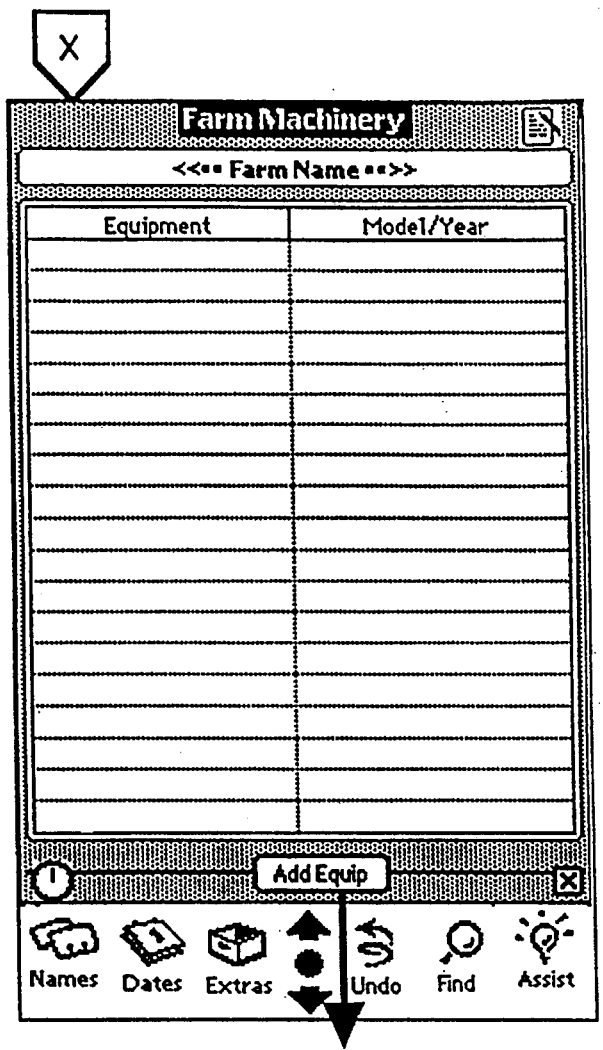
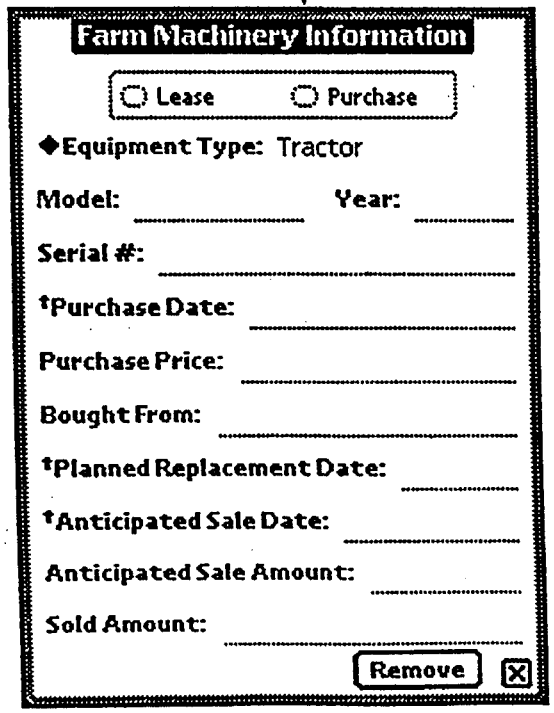
FIG. 32

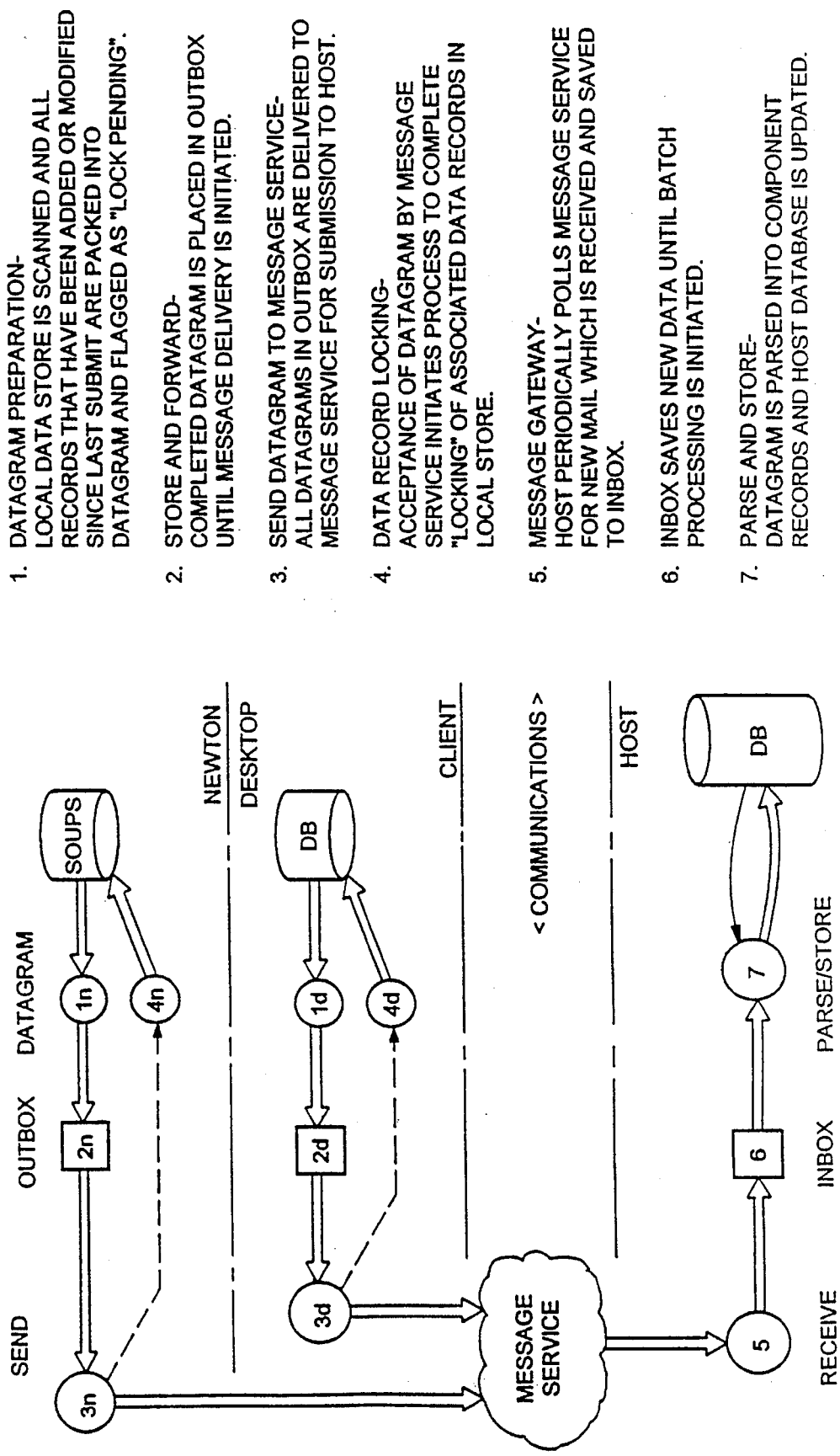

FIG. 34  INFIELDER DATA DELIVERY FLOW

DATA SUBMISSION COULD BE DONE FROM EITHER THE DESKTOP WORKSTATION (d) OR THE HANDHELD NEWTON (n)

1. DATAGRAM PREPARATION- LOCAL DATA STORE IS SCANNED AND ALL RECORDS THAT HAVE BEEN ADDED OR MODIFIED SINCE LAST SUBMIT ARE PACKED INTO DATAGRAM AND FLAGGED AS "LOCK PENDING".

2. STORE AND FORWARD- COMPLETED DATAGRAM IS PLACED IN OUTBOX UNTIL MESSAGE DELIVERY IS INITIATED.

3. SEND DATAGRAM TO MESSAGE SERVICE- ALL DATAGRAMS IN OUTBOX ARE DELIVERED TO MESSAGE SERVICE FOR SUBMISSION TO HOST.

4. DATA RECORD LOCKING- ACCEPTANCE OF DATAGRAM BY MESSAGE SERVICE INITIATES PROCESS TO COMPLETE "LOCKING" OF ASSOCIATED DATA RECORDS IN LOCAL STORE.

5. MESSAGE GATEWAY- HOST PERIODICALLY POLLS MESSAGE SERVICE FOR NEW MAIL WHICH IS RECEIVED AND SAVED TO INBOX.

6. INBOX SAVES NEW DATA UNTIL BATCH PROCESSING IS INITIATED.

7. PARSE AND STORE- DATAGRAM IS PARSED INTO COMPONENT RECORDS AND HOST DATABASE IS UPDATED.

INFIELDER NEWTON LIST BUILDER & LOADER
FIG. 35A
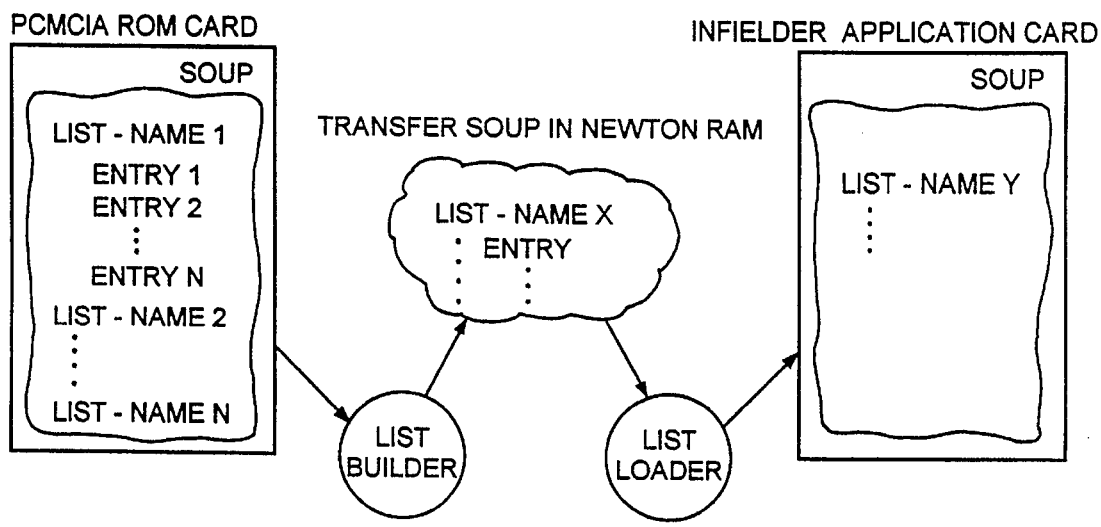
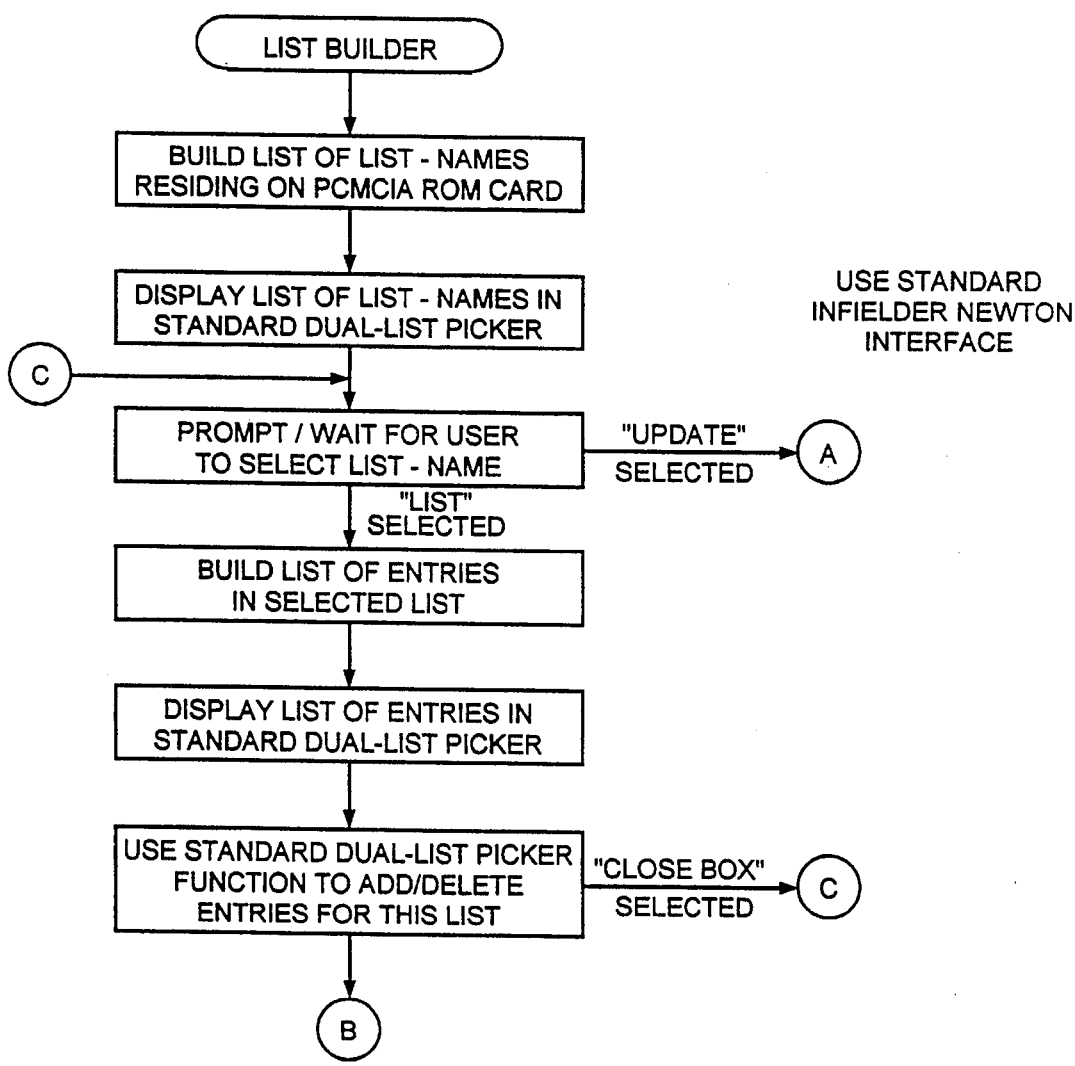
USE STANDARD INFIELDER NEWTON INTERFACE

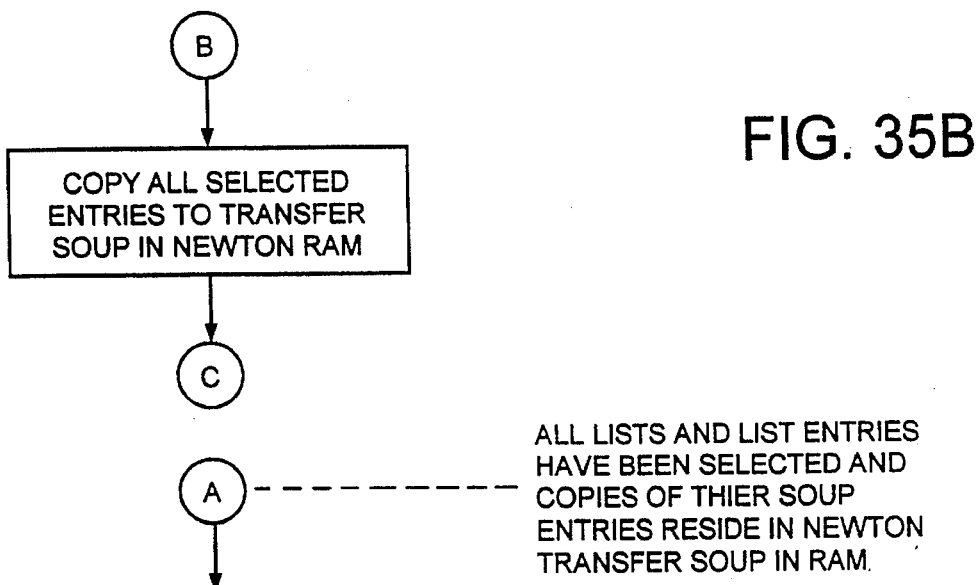
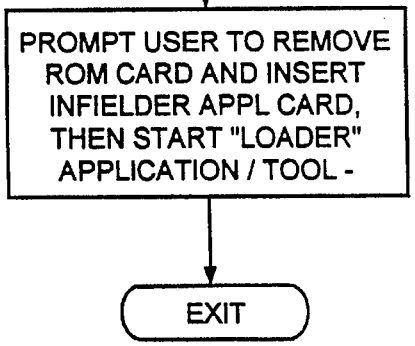
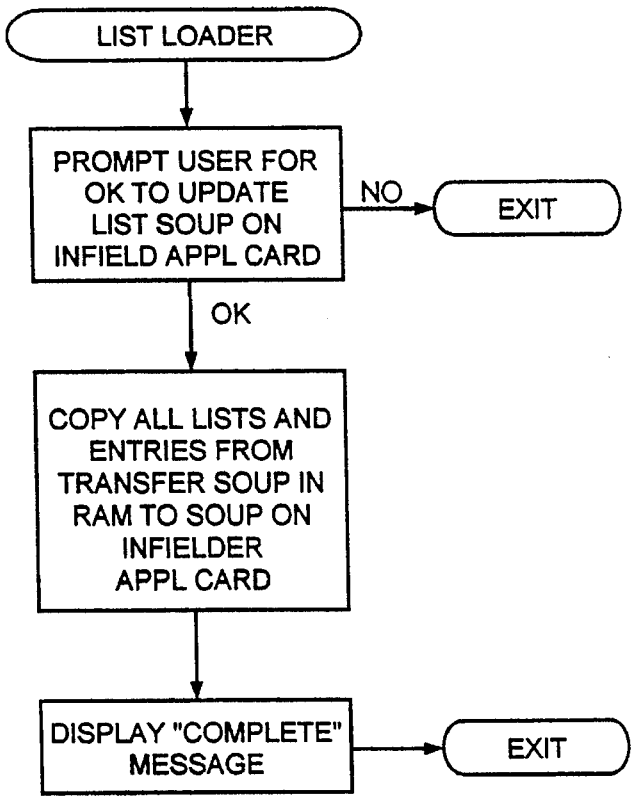
FIG. 35B

ANALYSIS AND REPORTING - CUSTOMER REQUEST VIA NEWTON

FIG. 39  INFIELDER MESSAGE RECEIVER

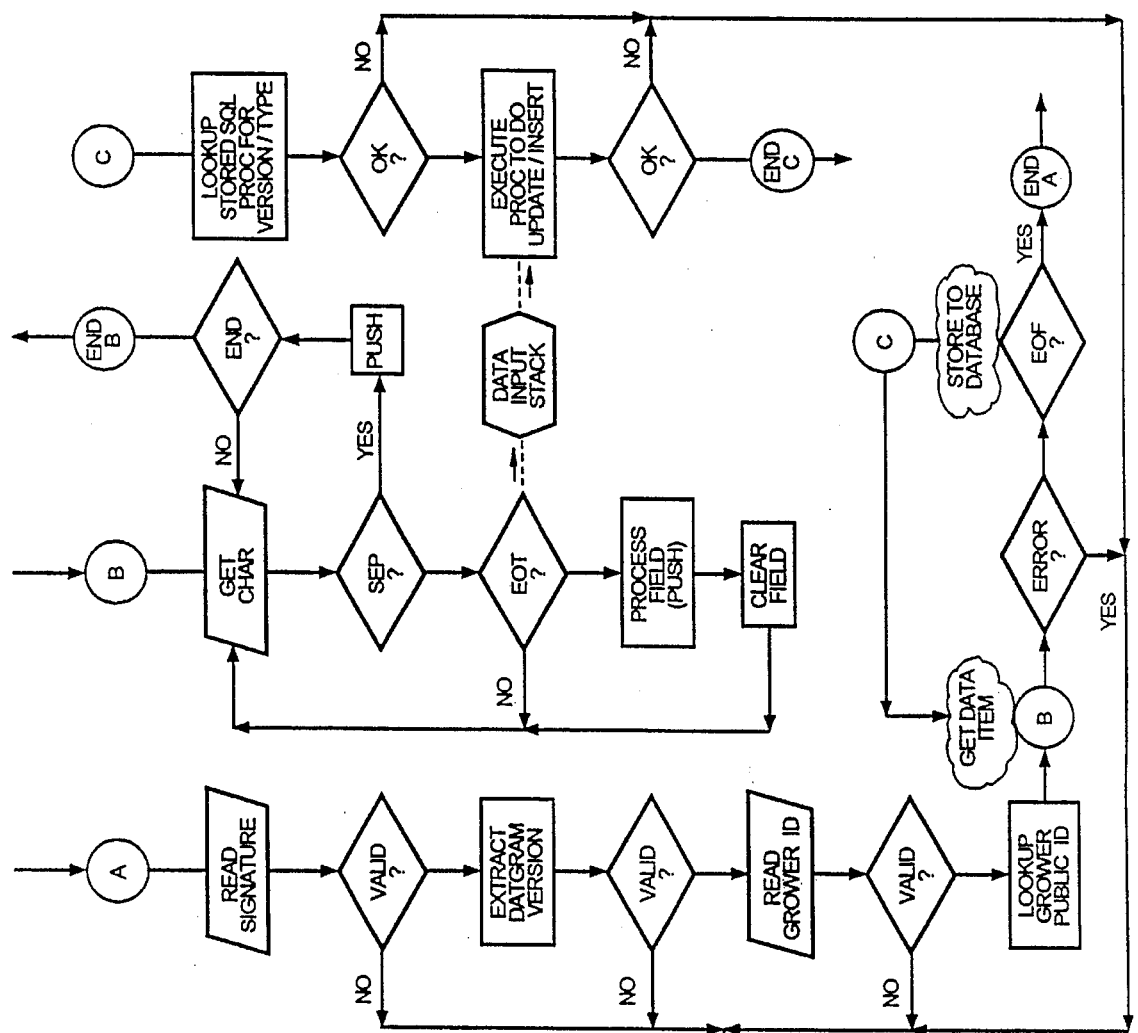
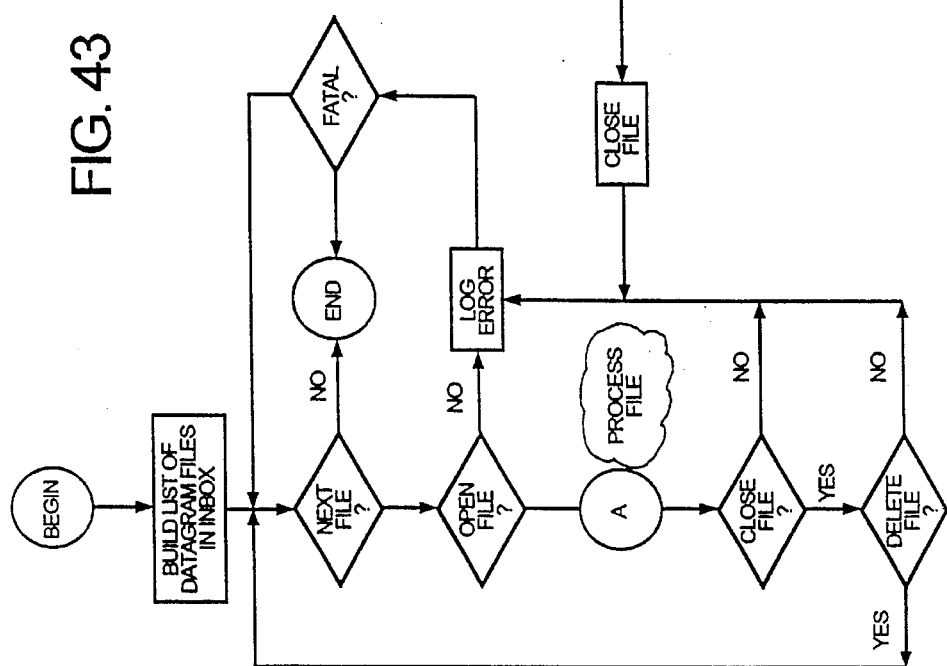
FIG. 43
DATAGRAM - PARSE AND STORE

FIG. 45

DATA PRIVACY

TO INSURE PRIVACY OF EACH GROWER'S OPERATIONAL DATA THE PUBLIC GROWER ID CAN ONLY BE USED TO LOOK UP GROWER PUBLIC INFO.

GROWERS

| GROWER ID | GROWER NAME | GROWER ADDRESS |
|---|---|---|
|  |  |  |
| ABC123X | JIM SMITH | P.O. BOX 12345 |
|  |  |  |

GROWER - REFS

| GROWER ID | REF |
|---|---|
| ABC123X | 123 |

OPERATIONS DATA

| REF |  |  |
|---|---|---|
|  |  |  |
| 123 |  |  |
| 123 |  |  |
|  |  |  |

OPERATIONS DATA IS STORED KEYED ON AN ANONYMOUS "REF" VALUE. MAPPING OF GROWER ID (PUBLIC) TO GROWER REF (PRIVATE) IS VIA A LEXICON TABLE CONSTRAINED BY SQL ACCESS CONTROL.

DATA SUBMITTED BY A FARMER IS PROCESSED BY A JOB WITH SUFFICIENT PRIVILEGE TO TRANSLATE GROWER ID TO PRIVATE REF - DATA IS THEN SPLIT FROM IDENTIFYING INFO, AND JOINS OF OP DATA TO ACTUAL GROWER BECOMES HIGHLY RESTRICTED.

REFERENCES

FARM NAME:
 JIM'S FARM

- AREA UNIT:   ACRES
- DEPTH /SPACING UNITS:   IN
- TEMPERATURE UNIT:   °F
- WIND SPEED UNIT:   MPH

INFIELDER™ VERSION 1.0d27

COMPUTER NETWORK FOR COLLECTING AND ANALYZING AGRONOMIC DATA

BACKGROUND AND SUMMARY OF THE INVENTION

There is a wealth of information utilized by a farmer in the agricultural operation of a farm. This information includes data related to the various types of soil in his fields, the types of crops planted in the past and intended to be planted in the next growing season, the scheduled time and actual performance of various farm operations on each field such as tilling, cultivating, etc., the various types of chemicals applied to each field such as fertilizers and herbicides, the various kinds of diseases and infestations of insects which are encountered in the growing season, weather information relating to rainfall and temperatures, etc. In the prior art, a farmer generally records only some of this information, as much of it as he considers to be usable, manually in the field. Additionally, many farmers are computer literate and will manually record limited categories and amounts of this information in the field and bring it back to their home for entry into their home PC. Unfortunately, as a farmer has many responsibilities and worries other than data collection, most often the farmer does not have time or on-the-spot opportunity to record what may be very significant data. Furthermore, this data collection chore can be quite time-consuming as it is generally achieved with a clipboard or notebook, or most commonly a piece of paper, which is easy to forget, misplace, or even lose. Unfortunately for the farmer, there are increasing demands on his time to collect data such as for reporting to various governmental agencies, including the EPA. Data collection has thus become a major problem which is being forced on farmers who have little help from any prior art devices.

Because of the increasing competition and mechanization of farming, data collection has become even more important for the farmer so that he might keep better track of his costs to determine the profitability of various crops planted on various fields throughout his farm. Typically, a farmer works on a close margin such that accurate cost accounting can be critical in helping a farmer make a decision as to the various crops planted and grown. Unfortunately, for various reasons, computers have not been successfully applied to the farmer's data collection and analysis problem.

In order to solve these and other problems in the prior art, the inventors herein have succeeded in designing and developing a unique computer network which includes a portable computer with a user-friendly interface for on-the-spot data recording by the farmer having sufficient capabilities for satisfying virtually all of his information handling needs. This computer network is comprised of a client-client-server configuration. As envisioned, a typical farmer would have two computers, a "field" or portable computer as well as a fixed platform PC operating with a graphic user interface. The portable computer function may be satisfied by one of the several Personal Digital Assistant (PDA) computers recently marketed by a number of computer companies. One such example is the APPLE® NEWTON® MESSAGE PAD®. These personal digital assistants (PDA) provide a screen display covering a substantial portion of a larger side thereof, simple graphic user interface (GUI) with handwriting recognition capability, and touch screen data entry with a stylus to greatly simplify the entry of data. A PDA is compact and portable so that a farmer may readily carry it wherever he goes, in the field, on a tractor, etc. Also, the PDA is rugged enough to withstand the rigors of a farm environment.

The inventors contemplate that other user-friendly interfaces will become available in portable computers, such as voice data entry, and that any computer with a "non-command line" or "non-typed" interface would be equally suitable for use herein. Of course, this simplified data entry feature lends itself uniquely to application for this problem in that farmers as a group are no different from others who have shied away from adapting to the computer age because of the perceived difficulty in communicating with a computer. This GUI and touch screen, or non-command line, data entry scheme significantly reduces a farmer's objection and increases the adaptability of the invention for that reason alone.

On this PDA, a custom stored program is loaded which includes a hierarchy of nested displays in each of four major areas. These four major areas are operations, weather, field use, and equipment. The information relating to a growing season may be conveniently pre-loaded into the PDA from a PC through a data link connecting the PDA with the fixed platform PC in the farmer's house. This PC includes an emulation of the GUI of the PDA and provides, through the windows mouse, the ability for the farmer to track through virtually the same operational program on his PC as is found in the PDA. This greatly enhances the system by reducing the amount of "computerese" that the farmer has to learn to a single, display-driven, program. In order to increase the usability of the system, the PC is provided with a program for manipulating the data base included in the PDA, and there is also a feature which permits the synchronization of the data base in the PDA with the data base in the PC, utilizing a paradigm of most recent data override. This helps eliminate errors which might otherwise creep into the data through use of two separate computers.

A farmer may conveniently carry his PDA with him as he farms to make data entries on the spot. This data is thusly "validated" by its time stamp and place of entry. This includes the completion of various farm operations such as tilling, the application of chemicals or herbicides to a field, the observed temperature or rainfall, or virtually any other data as is explained more completely in the preferred embodiment which follows. Thus, with the present invention, the farmer for the first time may conveniently and readily enter data with minimal interference in his farming operations.

Utilizing the PDA and PC combination alone would, in itself, greatly enhance a farmer's operation of an individual farm. However, the present invention further envisions the implementation of a third step to provide a client-client-server network configuration. That entails the widespread adoption of the PDA/PC computer pair throughout various regions of the country and their connection through an offline, batched, data link with a central computer or server. With this third level, or server computer, data from many farmers and farms may be collected which can be used to assemble a master data base, in real time, to provide for the prompt feedback of "best practices" data and projections for a farmer particularized as to his most geographically significant surroundings. For example, if a farmer has fields in a valley along with several other farmers, he may find out through this master data base what these other farmers have used to solve a particular problem such as controlling a particular crop disease or infestation. He may also find out detail relating to the time and type of various farming operations performed on the same or similar crops, and their success or failure in past years. This kind of information has been generally unavailable in the prior art, and certainly unavailable on a real time basis to provide information about other farmers' practices during the same growing season. This information may be critical to a farmer's success or failure with a particular crop. The need for this invention is thus quite apparent.

In order to implement this third or server computer, the inventors have incorporated into their invention a commercial messaging service which provides for the offline, batched, collection of data from the significant number of client-client sub-networks. One such service which may be utilized is MCI MAIL®. With these services, individual farmers would call in and transmit data, and that data would then be batched and collected by the server or an intermediary computer for dispatch onto the server, as the collected data fills a "batch". As a way of encouraging farmers to utilize this messaging service, various reports and other analyses may be performed and made available to a farmer only after he has transmitted his data to the batch. A farmer's access to this commercial messaging service may be restricted by utilizing an encryption routine embedded in the PC software for translation of a farmer-entered code into a valid account number, along with a password. Through this methodology, a significant connectivity problem may be solved with safeguards included to prevent any abuse or undesired use by a farmer of the commercial service which would run up charges for non-system use.

In developing the stored program for the PDA, the inventors herein have succeeded in solving several problems related to handling the oversized amount of data required for the large variations of possible entries. For example, there are as many as about 16,000 different types of soils from which a farmer may select for each of his fields. Storing these sizes of data bases in the PDA itself would be impractical and would impede the smooth, efficient entry of data which is a highly desired feature of the present invention. This problem has been solved by providing a PC having a much greater memory size from which a farmer may choose to load data into his PDA. Still another solution to that problem is the use of a memory card which may be inserted into a PDA from which the same selections may be made. This allows the PDA data base to be conveniently customized for each farmer. Still another feature of implementation includes the ability of the PDA stored program to intelligently preselect only logical entries to populate a number of pop-up screens from which a farmer must choose during his data entry process. The pop-up screens are thusly "context sensitive". For example, during certain growing stages of a crop, only certain kinds of herbicides for killing a particular weed are usable without damage to the crop itself. A sub-routine in the stored program acts to limit these herbicide entries in a pop-up list so that a farmer need not scroll through an inordinate number of herbicides, many of which would damage the crop or not kill that particular weed. These details of implementation are important in utilizing the PDA for the task at hand in that the size of the PDA screen is limited and long pop-up lists would require scrolling for unacceptably long time periods.

There are still other features of implementation which are more fully explained in the preferred embodiment and which contribute to the success of the present invention. While the principal advantages and features of the invention have been explained herein, a fuller understanding and appreciation for the invention may be obtained by referring to the drawings and description of the preferred embodiment which follow which are not intended to be limiting.

BRIEF DESCRIPTION OF THE DRAWINGS

FIG. 6 is a portion of a sample NEWTON® screen detailing the multi-picker routine for filling the lists of FIG. 5;

FIG. 16 is a pop-up list for entering crop information for a particular field;

Figure 19:
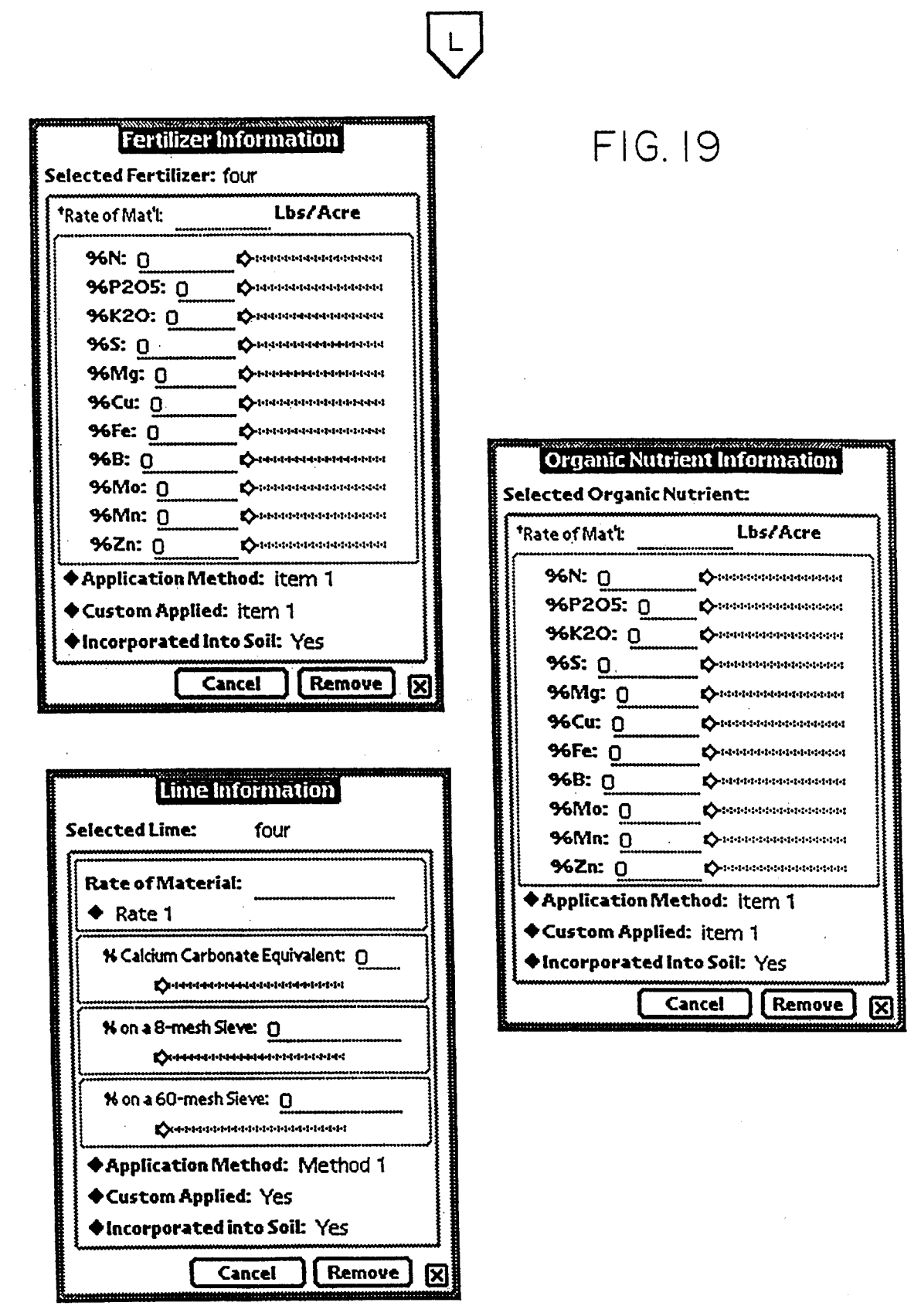

FIG. 19 are pop-up lists to implement the multi-picker function entry of data in FIG. 18;

FIG. 22 are pop-up lists as used for entering data as shown in FIG. 21;

FIG. 32 is a NEWTON® screen and pop-up list for entering and displaying farm machinery information for the farm;

FIG. 34 is an annotated flow chart detailing the overall data delivery flow between the mobile computer, the fixed platform PC, and on to the central computer through a messaging service;

FIG. 35 is a flow chart for a portable computer stored program module which enables selection and storage of data entries for populating pop-up lists in the portable computer;

FIG. 43 is a flow chart for a stored program module for the central computer which parses and stores datagrams into the central computer as transmitted from the user;

FIG. 45 is a diagram detailing the data base setup in the central computer which ensures data privacy;

DETAILED DESCRIPTION OF THE PREFERRED EMBODIMENT

Figure 1:
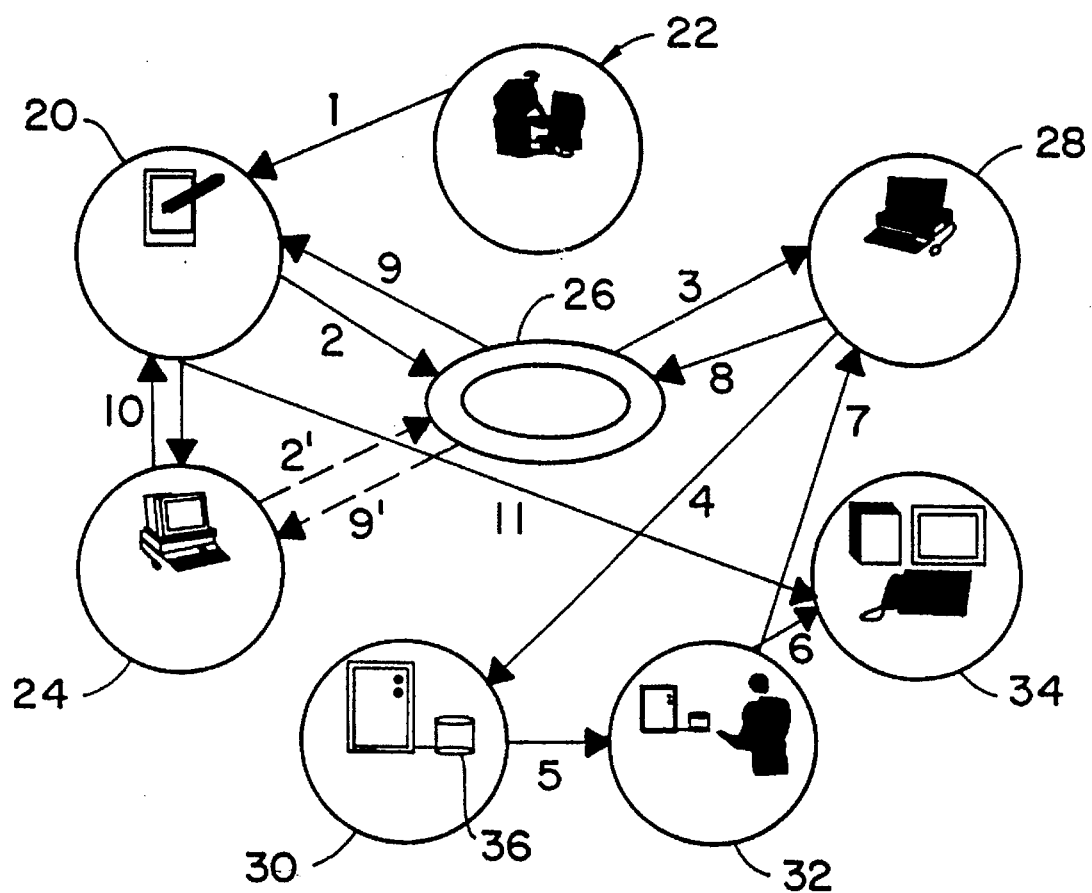
FIG. 1 is a block diagram of an information handling system utilizing the present invention.
Figure 2:
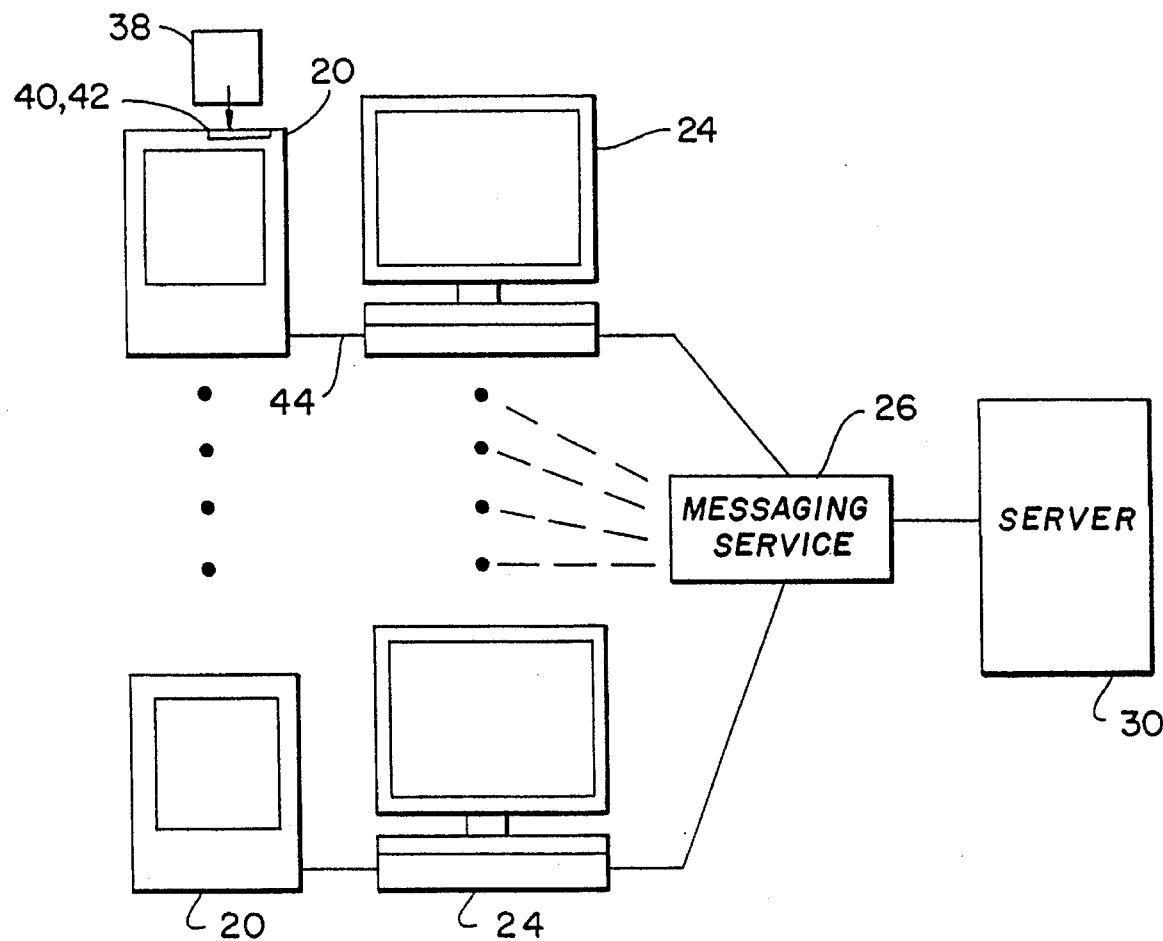
FIG. 2 is a schematic diagram detailing the client-client-server computer network comprising the present invention.

The present invention is part of a sophisticated data collection, processing, and reporting system which may be best understood by referring to FIG. 1. As shown therein, a mobile computer 20, in the preferred embodiment an APPLE® NEWTON® MESSAGE PAD® PDA, is used to collect and compile farm data for transmission back to a host computer. As each farmer acquires his mobile computer 20, a customer service function 22 will be made available to aid the farmer in setting up the specific parameters for the display driven software used as an aid in collecting data and also to obtain profile information on the particular farmer who will utilize the mobile computer 20. This is indicated by an arrow labeled 1 in FIG. 1. After setup, information will be entered by the farmer on his mobile computer 20 and transmitted to a messaging company. This is indicated by an arrow labeled 2. For convenience, and as explained further herein, a desktop computer 24 will interact with the mobile computer 20 and, as initially implemented, will communicate with the messaging company 26 as shown by the dotted line arrow labeled 2'. There is added functionality to accommodate this arrangement, as will be explained below. A message gateway computer 28 periodically polls the messaging company 26 and downloads any messages waiting there. Although only a single farmer is depicted in FIG. 1, the inventors' intent is that many farmers be connected such that this portion of the system will in fact be configured more akin to that as depicted in FIG. 2. The downloading of messages from the messaging company 26 by the message gateway computer 28 is depicted by an arrow labeled 3. The message gateway computer 28 parses the messages for content, performs range checking and validation of the data, and then transmits the data to the host data base computer, or central computer 30 as depicted by the arrow labeled 4. Data from the central computer 30 may be periodically processed statistically and analyzed in many ways, including further computer analysis, and is shown representationally as an analysis function 32 with data being transmitted as shown by an arrow labeled 5. This analysis function 32 may then be used to generate finished reports 34 over an arrow labeled 6. These finished reports may be distributed to farmers through the message gateway computer 28 and messaging company 26 back to the farmer if the analysis was performed as a result of a query from the farmer. This data path is represented by arrows labeled 7–9. (As initially configured, the transmission from the messaging company would go to the desktop computer 24 over the dotted line arrow labeled 9'.) Additionally, the finished reports may be distributed via postal mail, facsimile, and online bulletin boards such as COMPUSERVE™ (arrow 11) for selective access by any farmer connected to the system. As alluded to above, the desktop computer 24 forms part of the initial configuration and provides additional functionality for the farmer. For example, the farmer may backup and restore the data on the mobile computer 20 from a data base maintained at the desktop computer 24. Additionally, desktop computer 24 may be utilized to perform its own statistical analysis and generate reports which are farmer specific and which do not require access to the master data base maintained at the central computer 30.

As is apparent from the overview provided, the present invention provides a modular approach in a client-client-server network configuration for "computerizing" the farming or agricultural process from a micro level up to a macro level. The client-client-server network corresponds to the NEWTON®, desktop computer, and host server, with data links between those components for the free flow of information therebetween. This overall system provides ready scalability which is enhanced by the use of a messaging company 26 as the hub between the large number of farmers and the central computer 30. This messaging company 26 provides an offline batching data link as a hub or interface with a gateway computer 28 for coordinating the transfer of data in batches to the central computer 30. This provides unique advantages over any online modem or call-up configuration which would require the central computer 30 to be capable of simultaneously handling many thousands of calls. An alternative to online modem connection would be a polling function wherein the central computer 30 would regularly poll each farmer to download his data. Again, this requires a significant overhead for the central computer 30, or even a message gateway computer 28, and would require a farmer to be "online". These problems are avoided through the use of the messaging company 26.

The master data base 36 at the central computer 30 provides storage and retrieval of collected farm data, customer/farm profiles, and agronomic information. The farm data consists of recorded field operations and daily weather data. The collection frequency of the field operations will vary according to season, weather, crop type, and farmer preference. The field operations and weather data will be formatted, validated, and loaded nightly by the data preprocessing provided by the message gateway computer 28. Customer information will also be provided to the master data base and will consist of a grower profile, field descriptions, farm equipment information, farm assets, and report order information. This information will be provided initially and updated regularly through the customer service function 22. The specifics relating to the collection of these data will be further explained below in connection with the display driven software of mobile computer 20 and desktop computer 24.

PORTABLE COMPUTER SOFTWARE

The display driven software provided by the inventors herein for the portable computer which, preferably, utilizes a graphic user interface, may be best understood by referring to the series of drawings identified as FIGS. 3 through 32. Generally, the portable computer software is laid out as a series of nested displays of different levels with each level indicating the hierarchy of screens accessed by the user, the screens thus being grouped and organized according to the way they can be accessed. The layout is a relatively simple structure and is organized according to the logical sequence of features and functionality from the user's perspective. By maintaining a simple and consistent system layout, the user may feel comfortable in using the system by sensing their control and knowledge of their location in the system. This leads to a perception that the user can freely and intuitively navigate through the system to get where they want to go without repeated trial and error.

Figure 3:
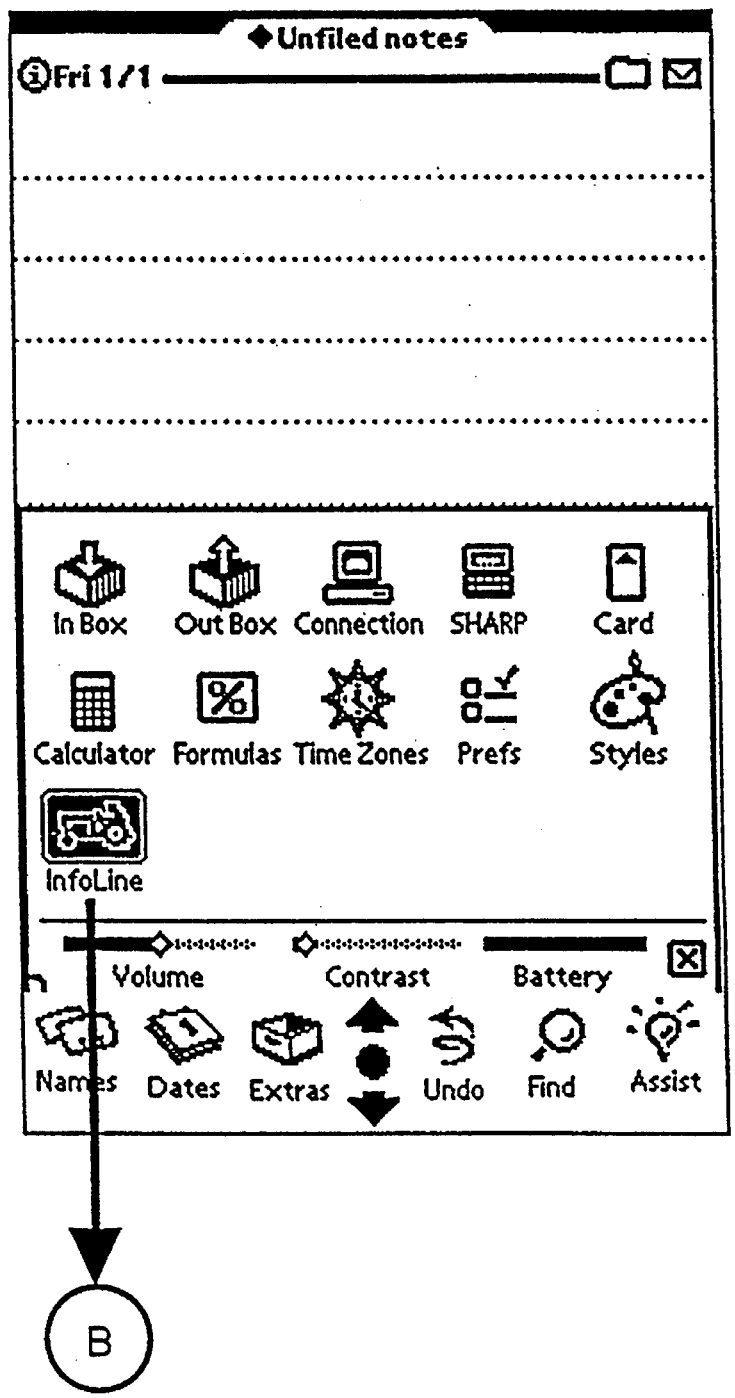
FIG. 3 is a NEWTON® display for its Extras File.
Figure 4:
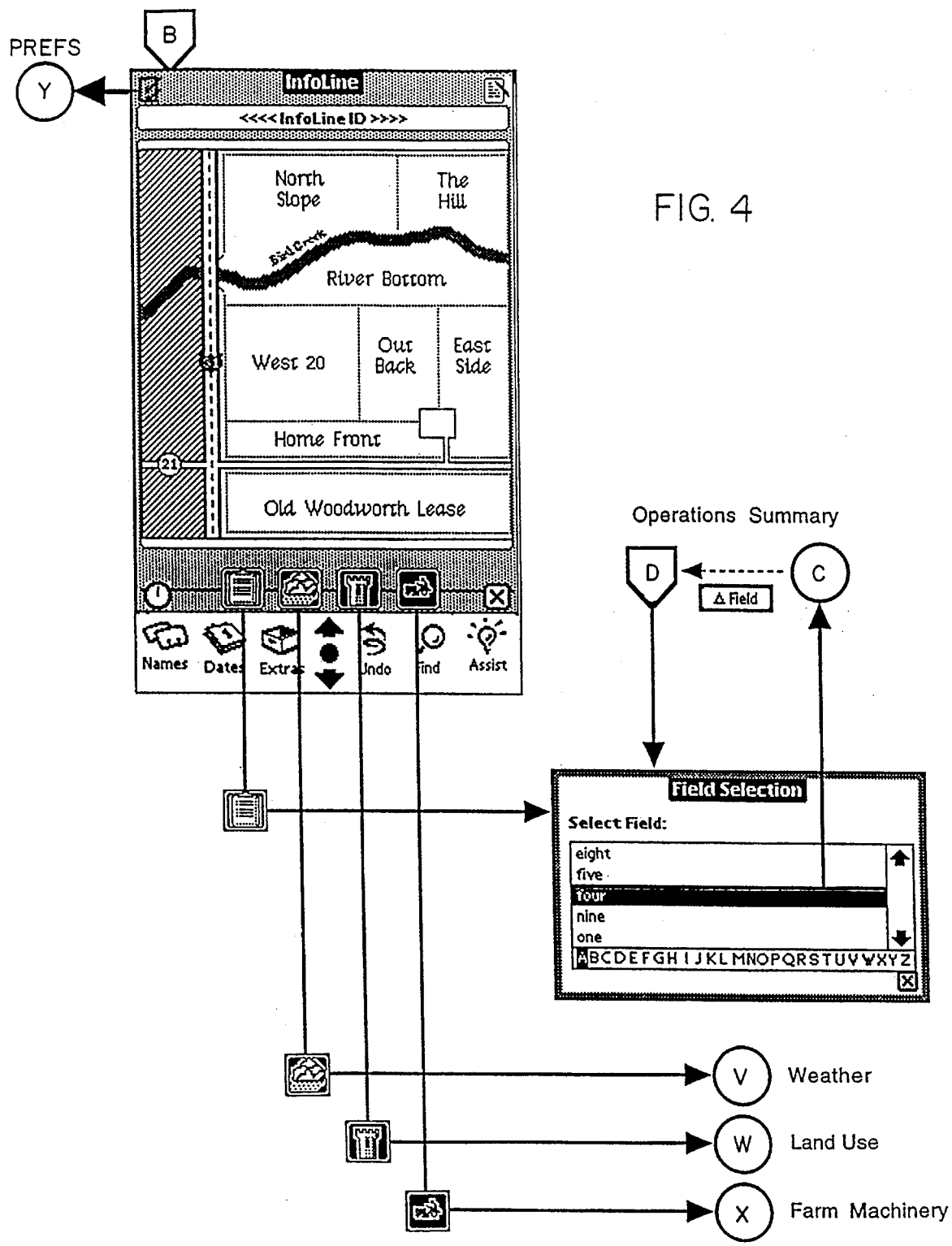
FIG. 4 is the "splash" screen or initial screen of the NEWTON® program.
Figure 47:
FIG. 47 is a sample NEWTON® screen depicting the preferences screen.

FIG. 3 represents the NEWTON® Extras Drawer Screen from which the user accesses the Infoline application, or portable computer application, by tapping on the indicated picture button. By doing so, the display of FIG. 4 will appear which represents the main Infoline screen. This screen is the home base that allows the user to access the many features of the application. From this screen, the user can access or gain access to all of the Infoline application features by tapping the picture buttons shown at the bottom of the screen. As indicated in FIG. 4, and going from left to right, the "CHART" picture button selects the field selection set of nested displays. The "RAIN CLOUD" button selects the weather set of nested displays. The "SILO" button selects the land use nested displays. The "TRACTOR" button selects the farm machinery set of displays. At the upper left corner of the screen is a "preferences" button which, when selected, will display the screen of FIG. 47, permitting the user to select units of measure and enter the farm name.

Figure 5:
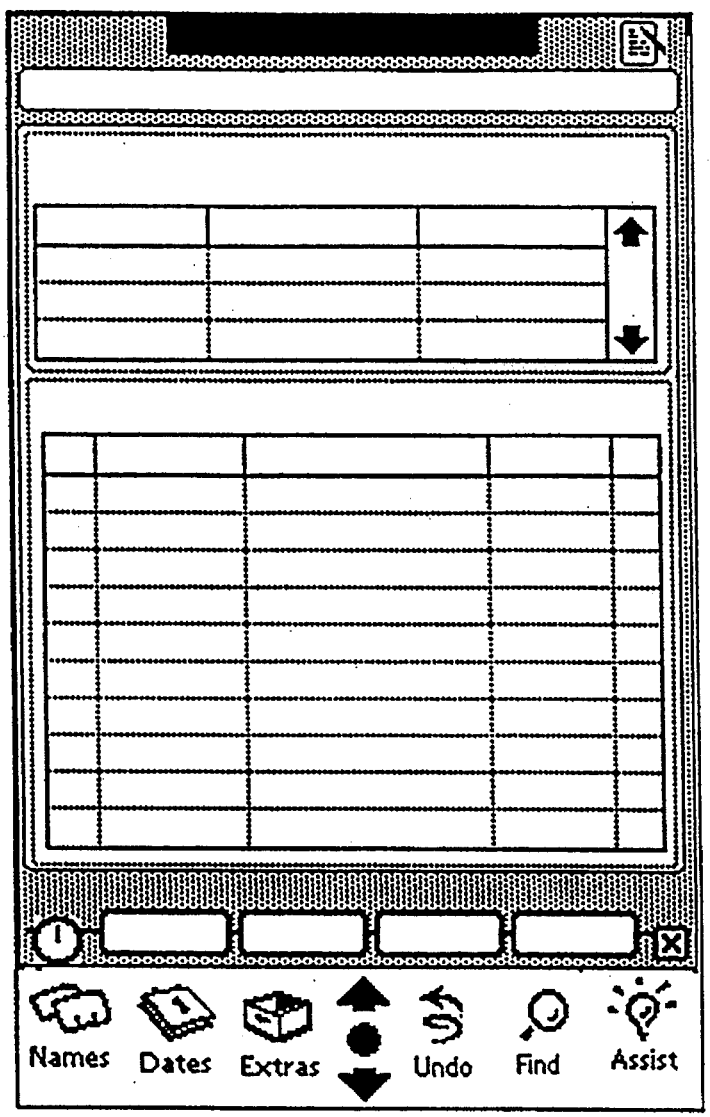
FIG. 5 is a sample NEWTON® screen depicting scrolling lists.
Figure 7:
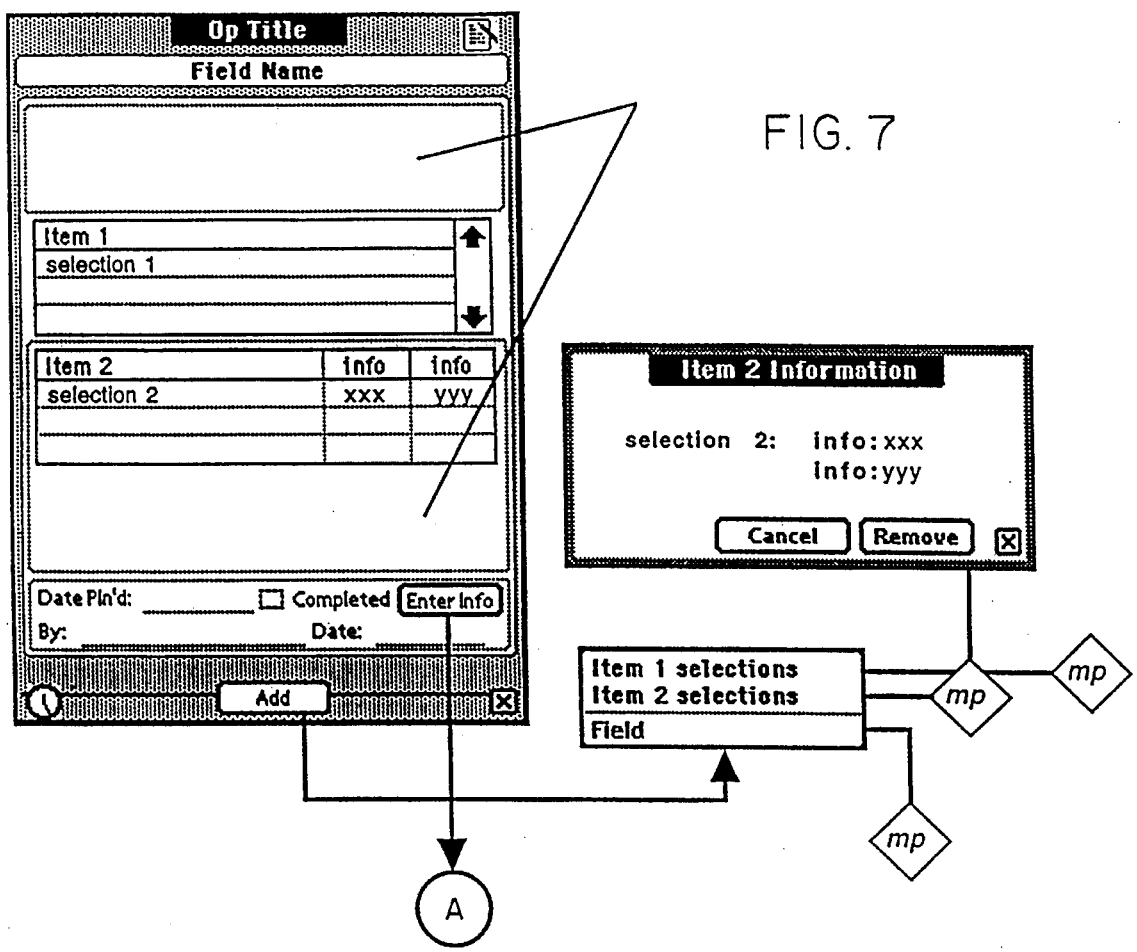
FIG. 7 is a sample NEWTON® screen utilized in editing field operations.
Figure 8:
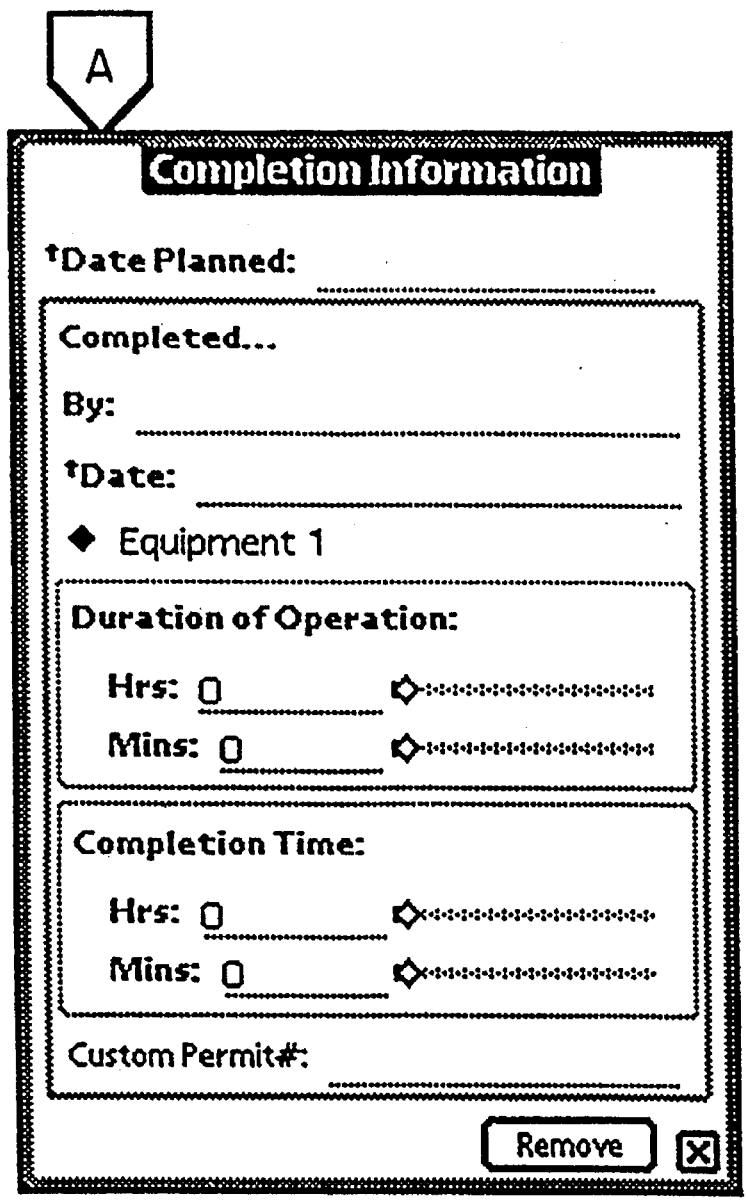
FIG. 8 is a sample NEWTON® pop-up list for the entry of completion data.
Figure 9:
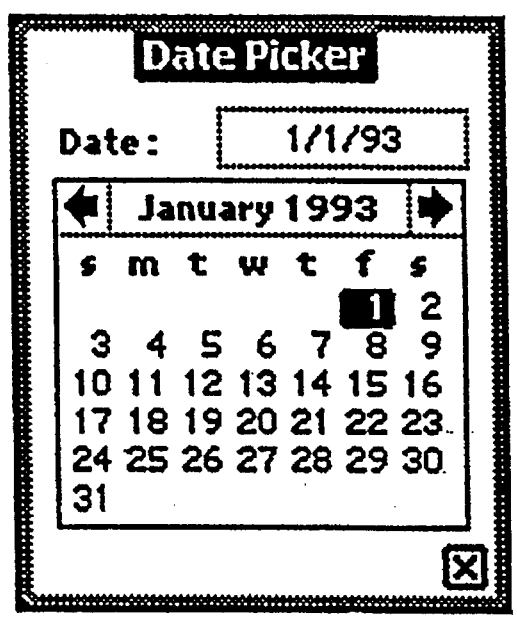
FIG. 9 is a sample NEWTON® pop-up list for picking dates to be entered.
Figure 10:
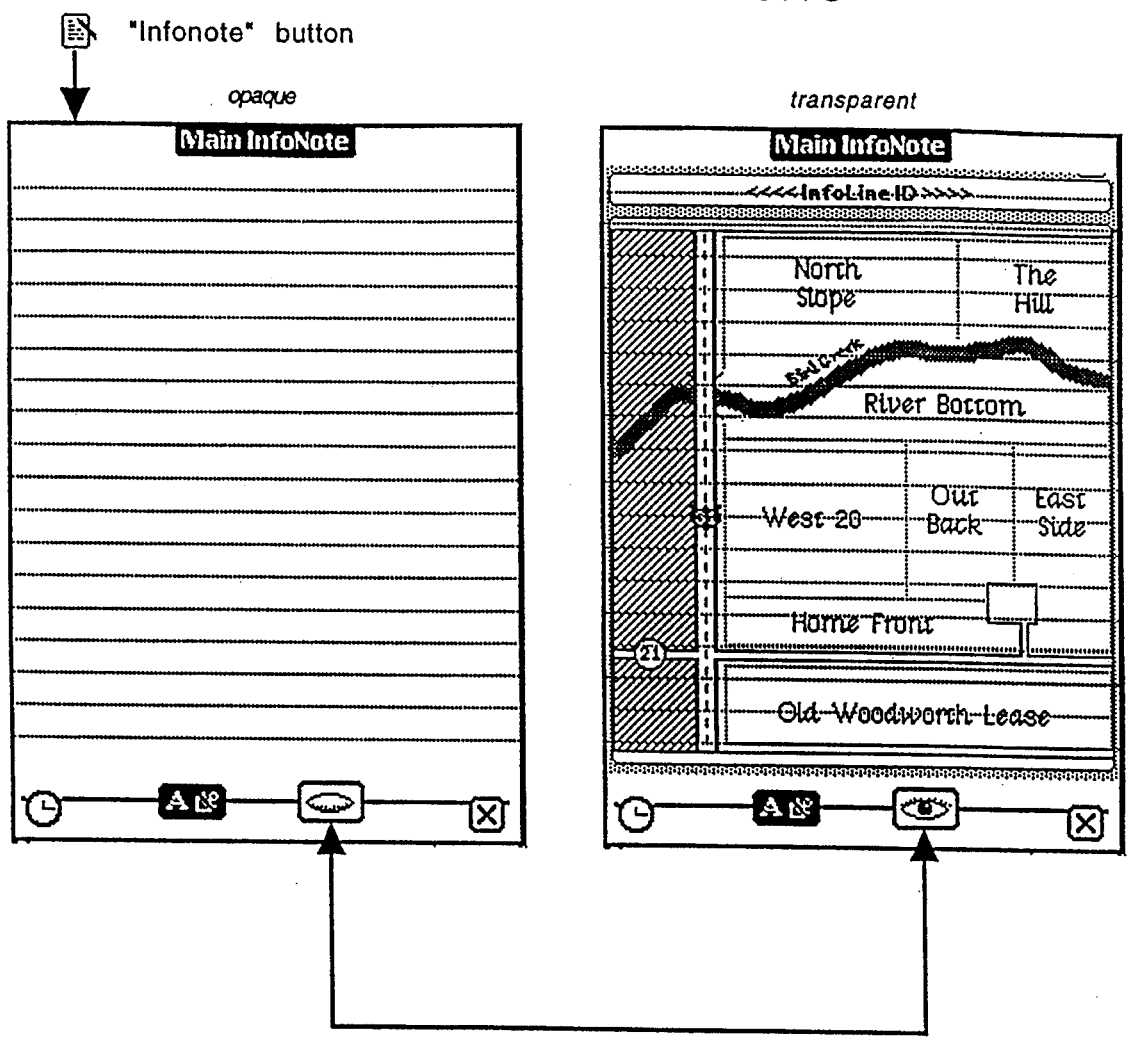
FIG. 10 depicts the NEWTON® screen for entering detail notes.

Before explaining the more detailed operation of the software, it will be helpful to first understand several conventions which are utilized throughout the software. As shown in FIG. 5, a scrolling list display provides a set of arrows which, when depressed, scroll the corresponding display. As shown in FIG. 6, multi-list selections may be made utilizing scrolling displays in a "multi-picker" arrangement. As depicted in the figure, an upper scrolling list may be assembled by selecting any one of the entries in the lower scrolling list and depressing the "ADD" button, or by selecting any one of the entries in the upper scrolling display and depressing the "REMOVE" button. Access to more detailed information is available by double selecting any entry. Where multi-picking is utilized in the program, an "MP" symbol is used as indicated. Field operations may be edited as shown in FIG. 7, with the multi-picking methodology as just explained. The "ENTER INFO" button displays a completion screen as shown in FIG. 8 wherein "slide bars" are used for entering numerical data such as hours and minutes. By depressing and moving any one of the "slide bars", the number in the hours or minutes display may be moved up or down to match the desired time to be entered. A date picker is shown in FIG. 9 wherein a calendar is displayed and months may be scrolled or days of any months selected by tapping a different date in the month in order to change the displayed date which will then be entered. At various points in the program, additional note-taking information is made available through an auxiliary screen for that purpose as shown in FIG. 10 entitled "INFO NOTES". This note-taking page is accessed by tapping on the "INFO NOTE" button.

Figure 11:
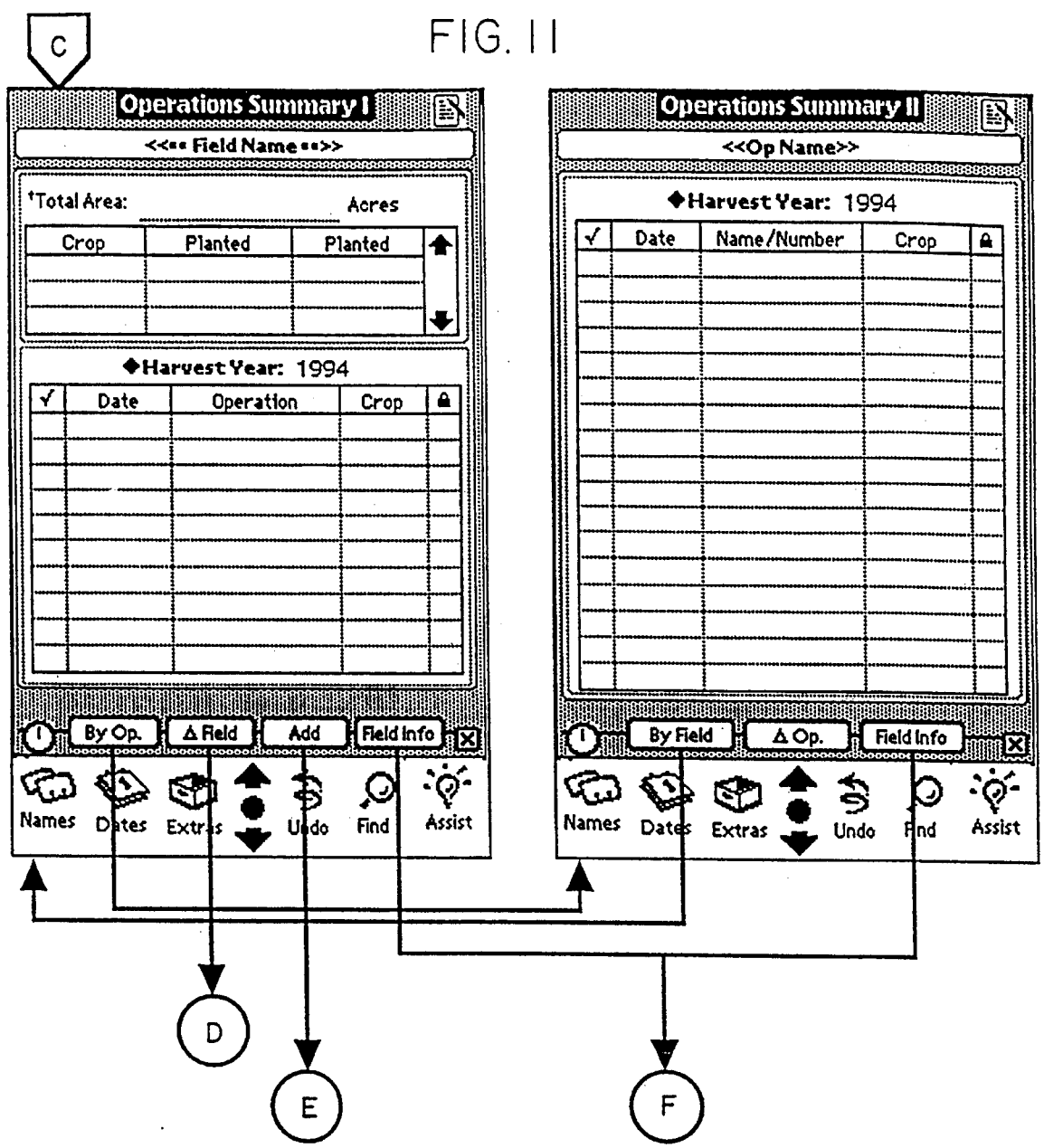
FIG. 11 is the NEWTON® screen wherein field operations may be displayed by either field or operation.
Figure 12:
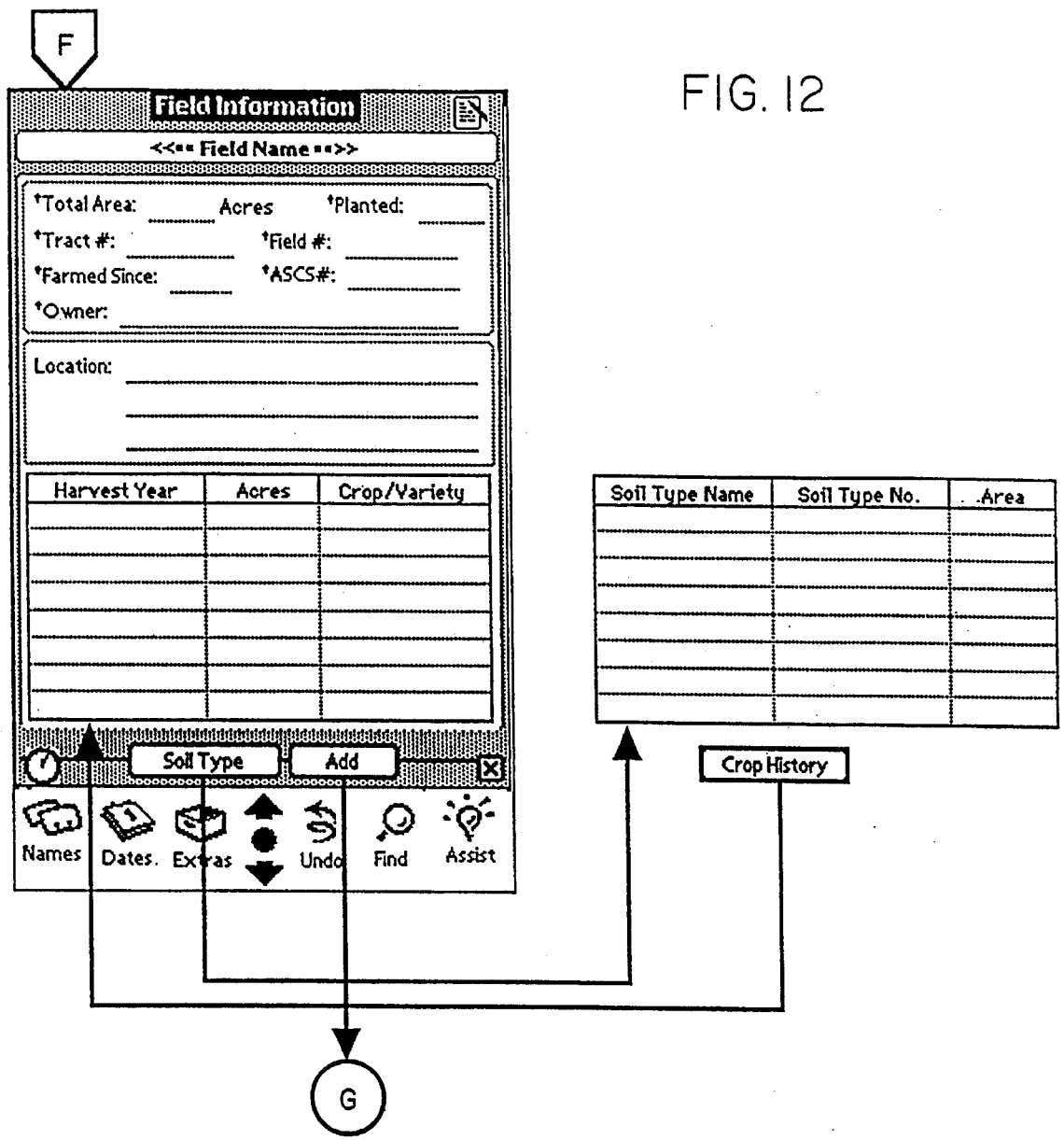
FIG. 12 is a NEWTON® screen depicting the pop-up list for adding soil type to a particular field.
Figure 13:
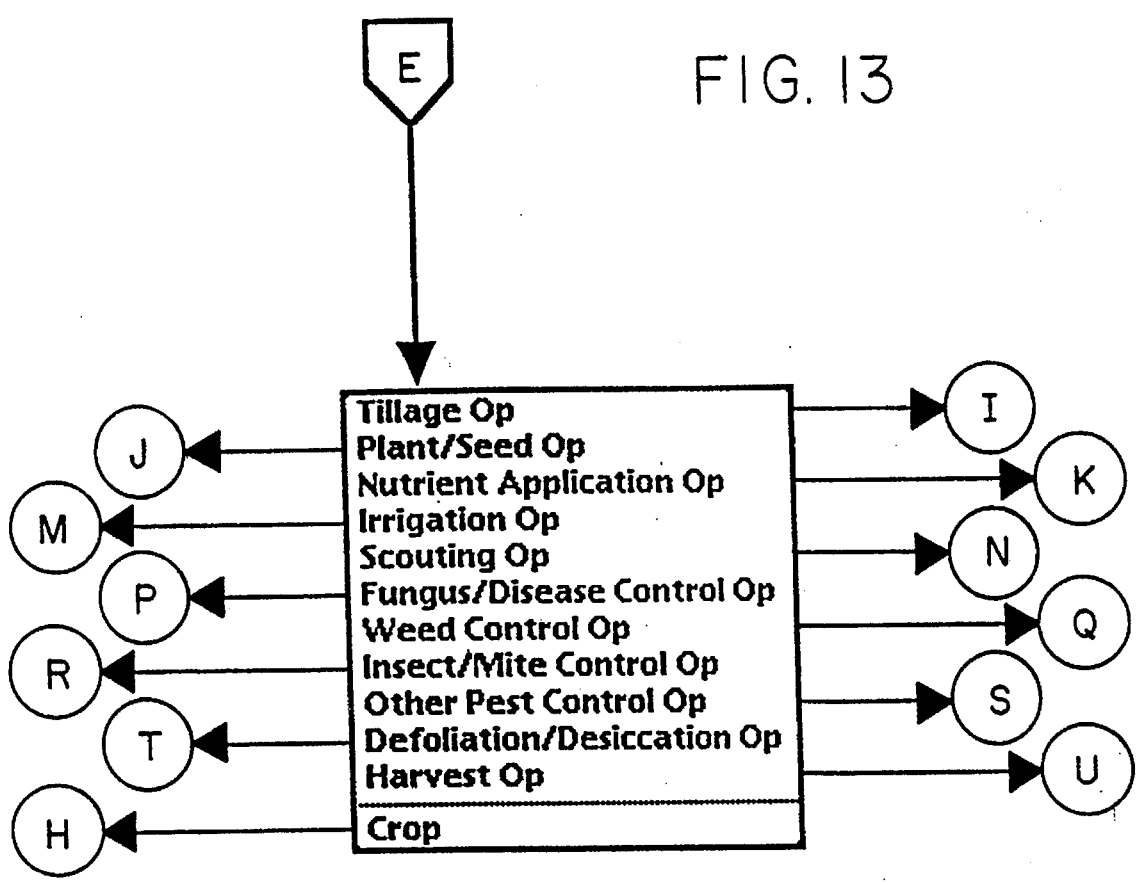
FIG. 13 is a NEWTON® pop-up list for adding field operations.
Figure 14:
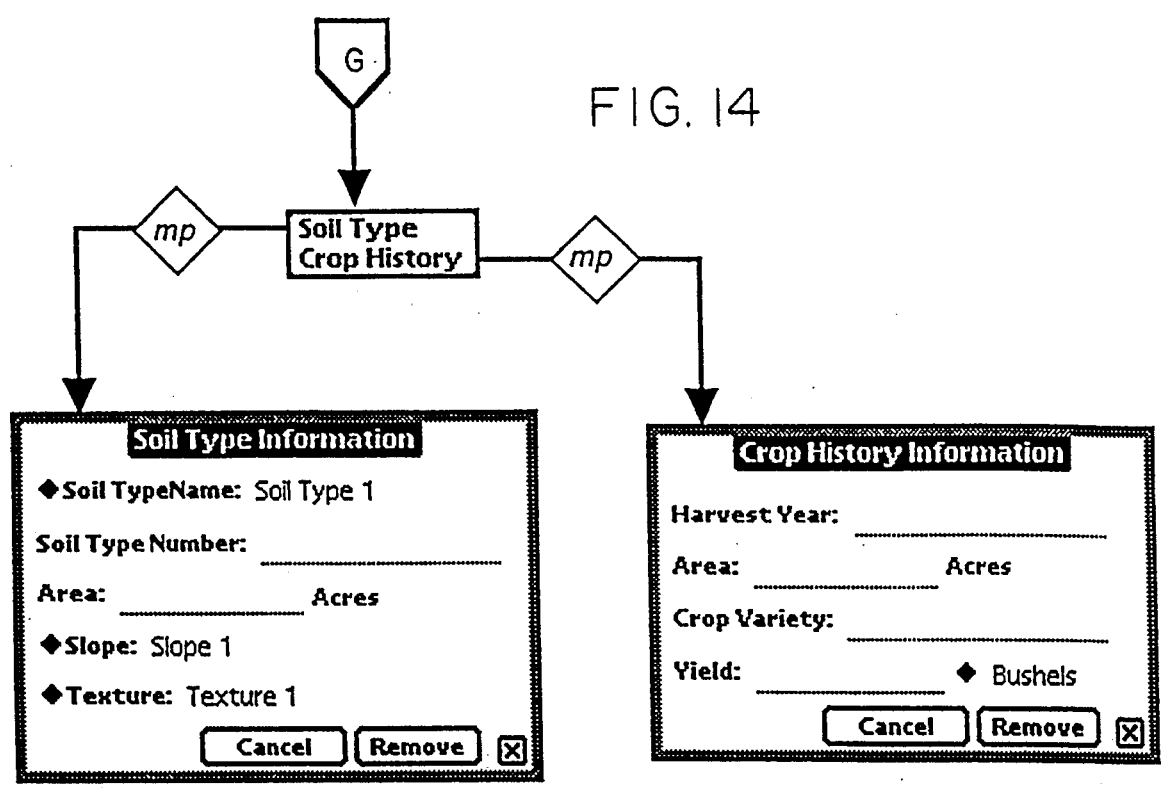
FIG. 14 are a pair of NEWTON® pop-up lists for entering soil type and crop history information for a particular field.
Figure 15:
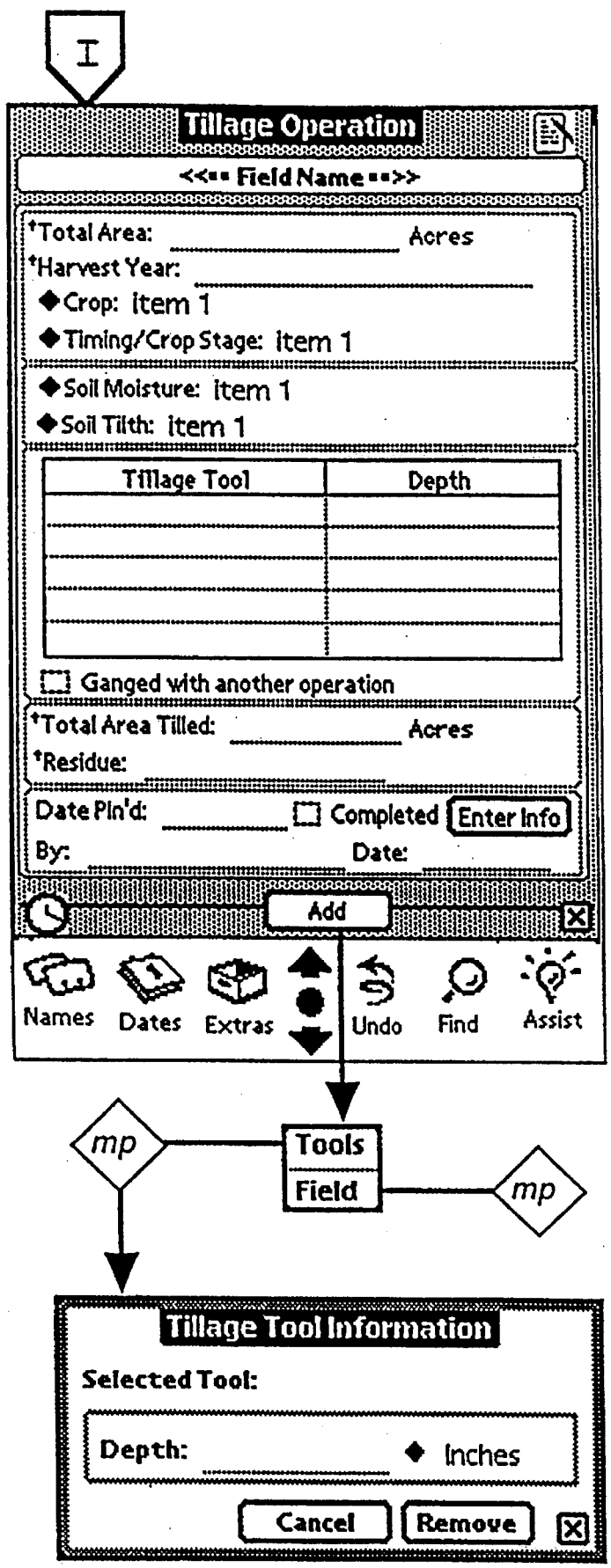
FIG. 15 is a NEWTON® screen with pop-up list for entering tillage operation information.
Figure 17:
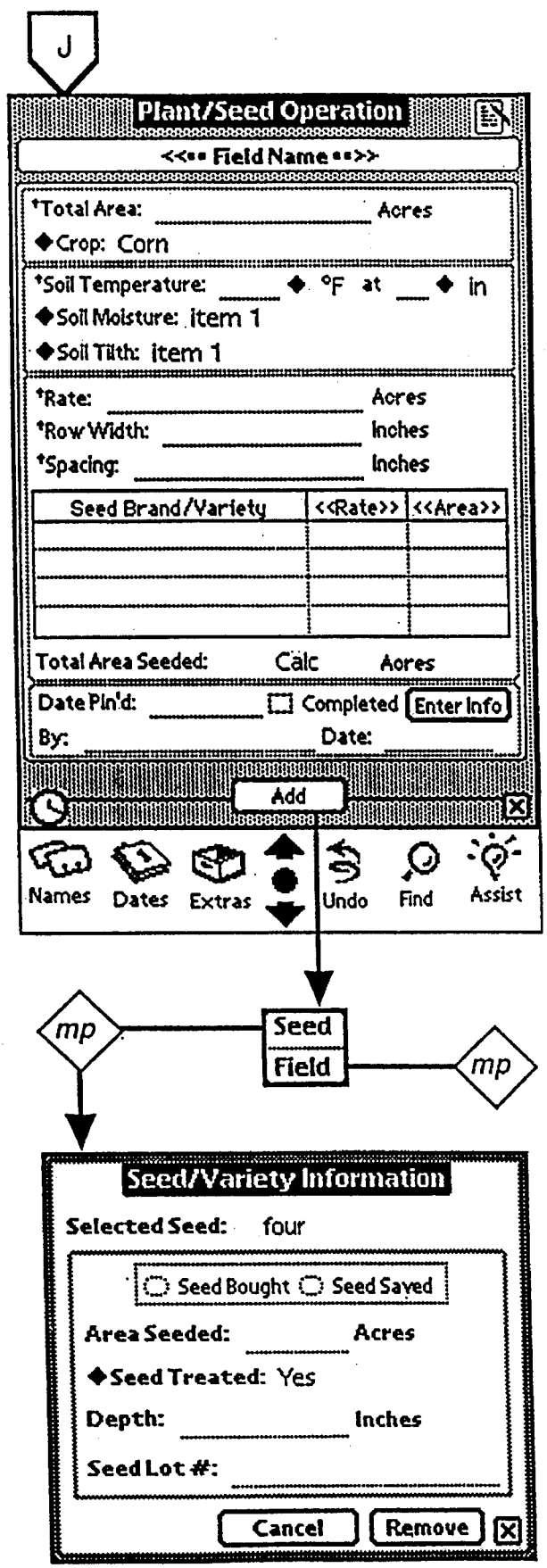
FIG. 17 is a NEWTON® screen with pop-up list for entering plant/seed operation data for a particular field.
Figure 18:
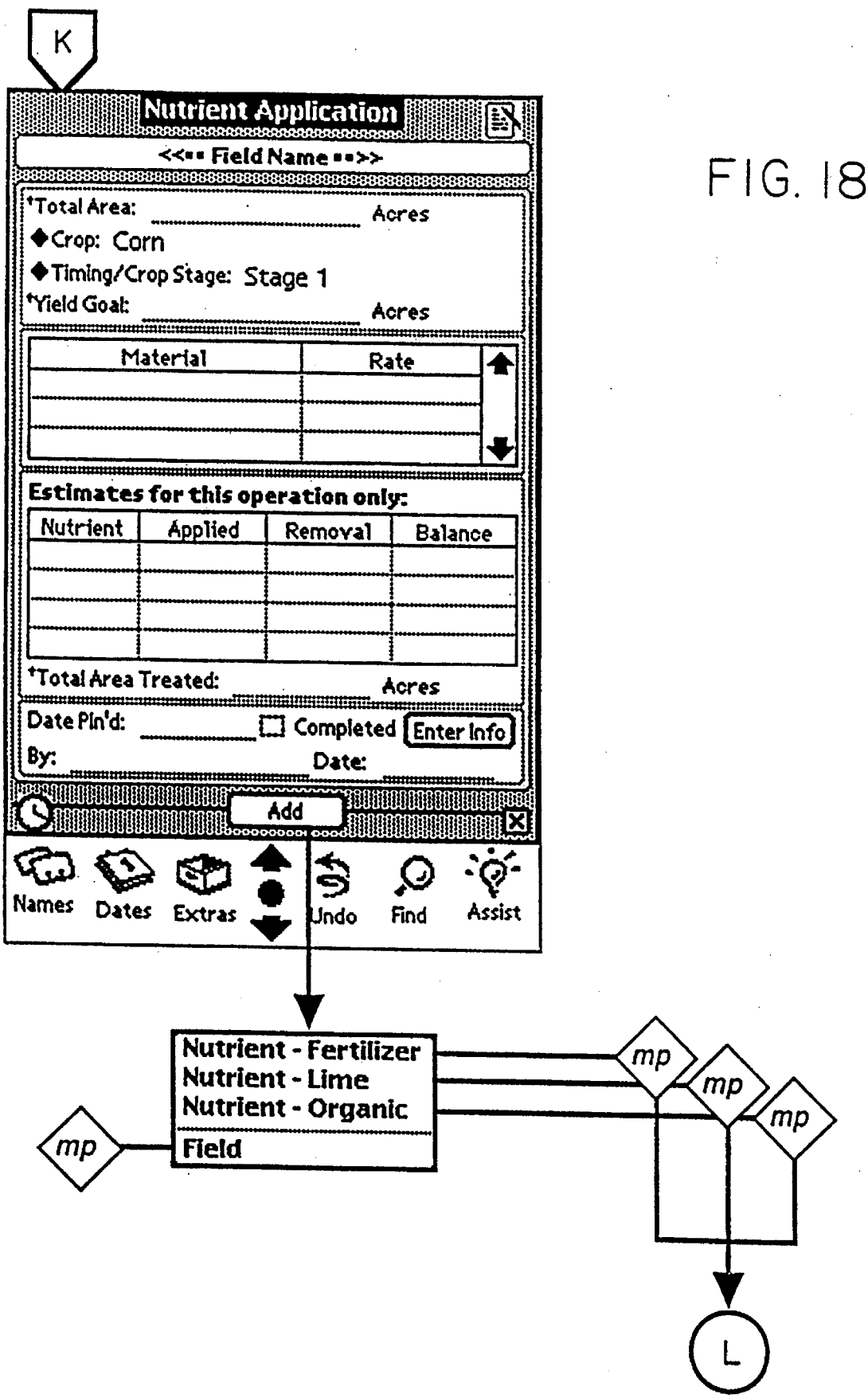
FIG. 18 is a NEWTON® screen with multi-picker function as shown in FIG. 19 for entering nutrient information for a particular field.
Figure 20:
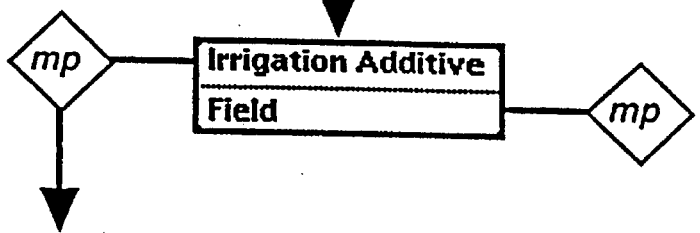
FIG. 20 is a NEWTON® screen with pop-up list for entering irrigation data with a multi-picker function.
Figure 21:
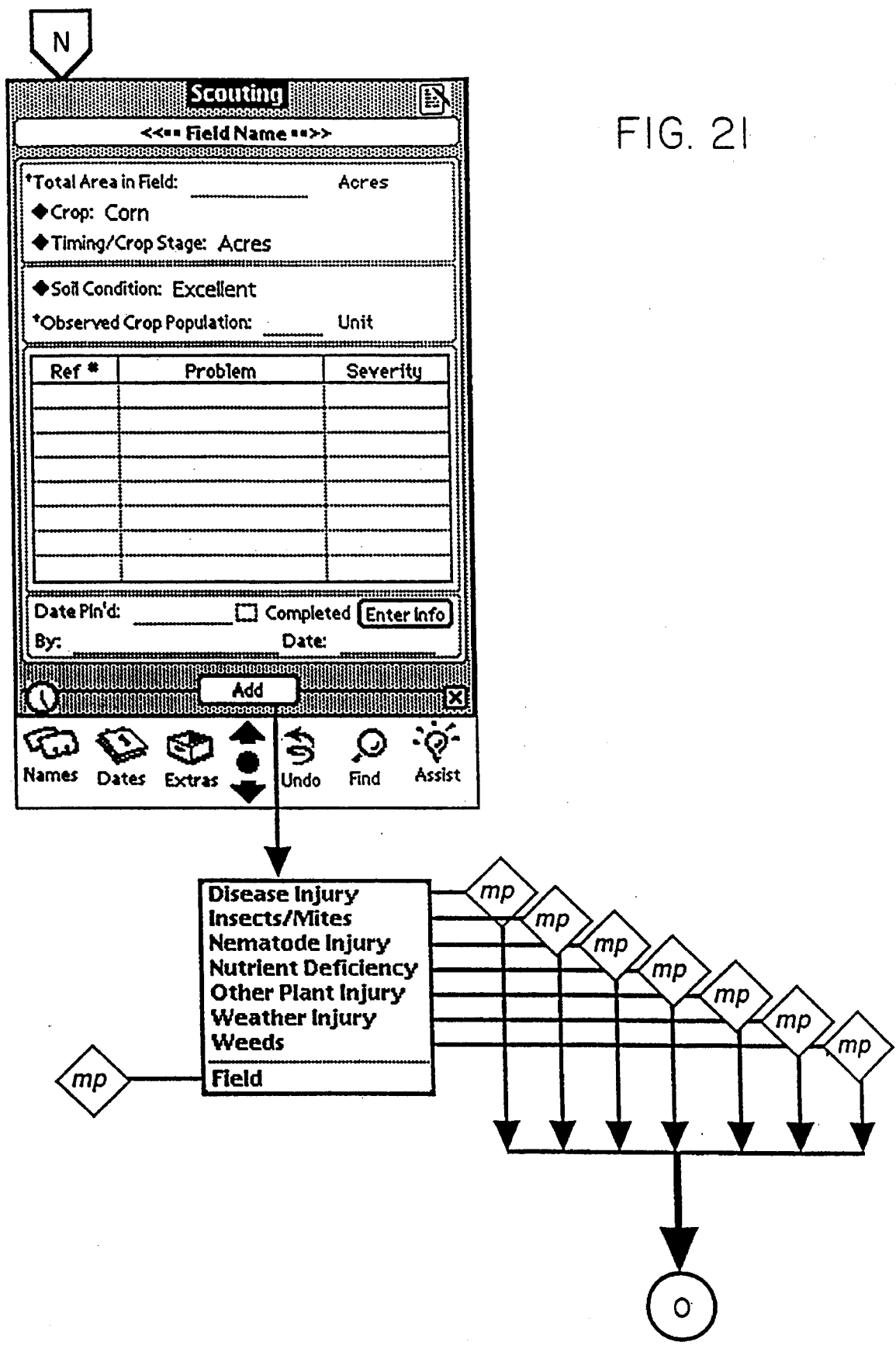
FIG. 21 is a NEWTON® screen for entering scouting information relating to various diseases, insect, plant injury, or weed information with multi-picker pop-ups as shown in FIG. 22 for a particular field.
Figure 23:
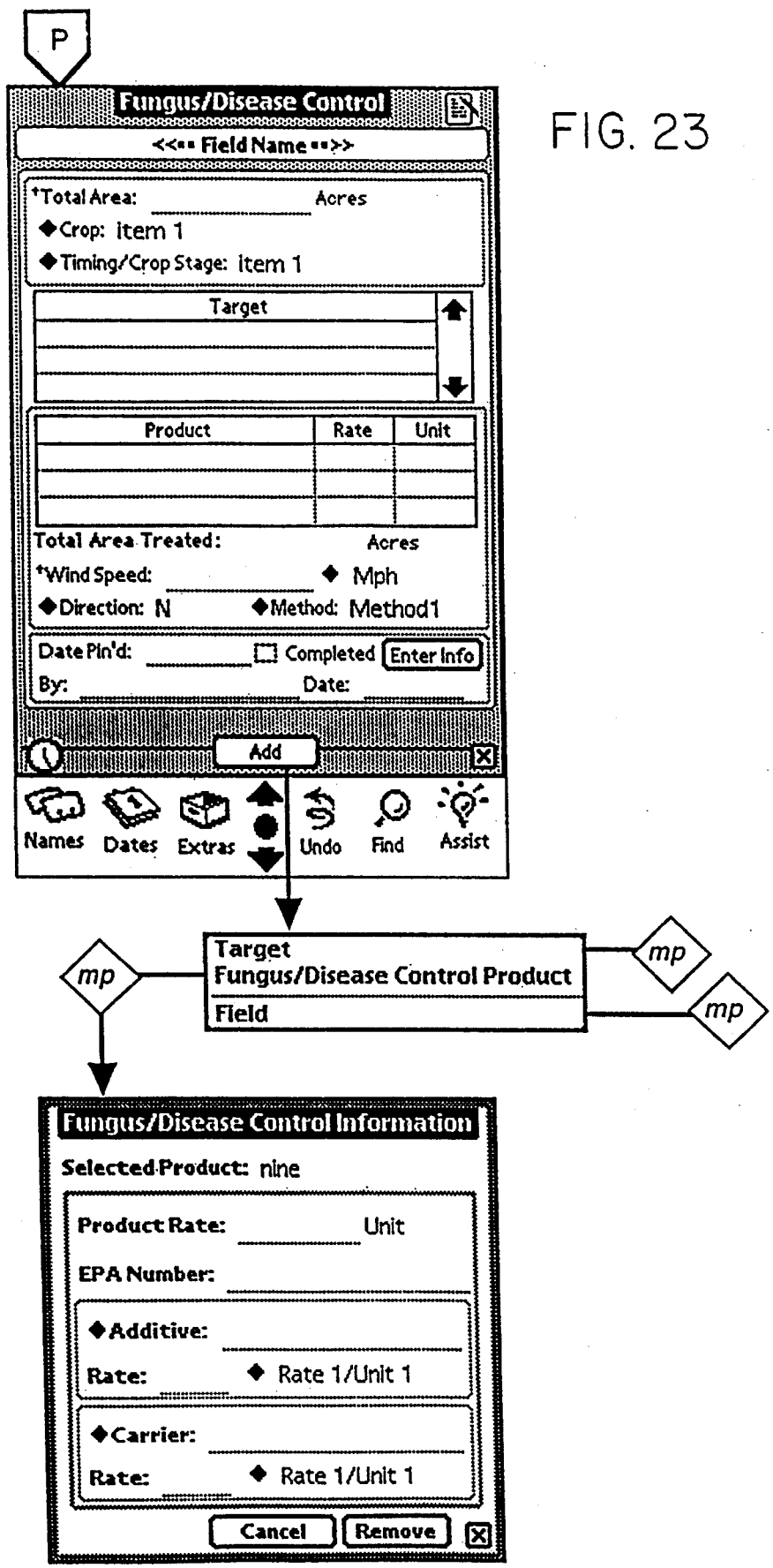
FIG. 23 is a NEWTON® screen with pop-up lists and multi-picker function for entering fungus/disease control information for a particular field.
Figure 24:
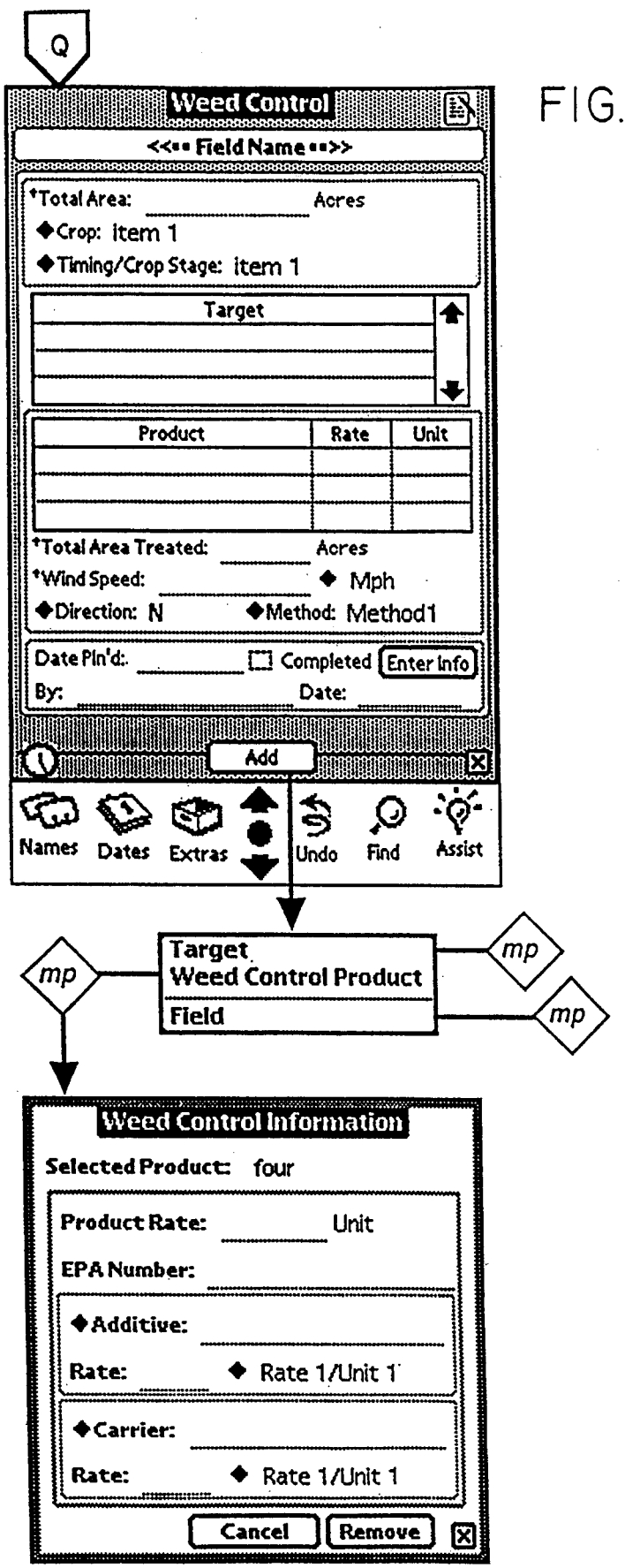
FIG. 24 is a NEWTON® screen with pop-up list and multi-picker function for entering weed control data for a particular field.
Figure 25:
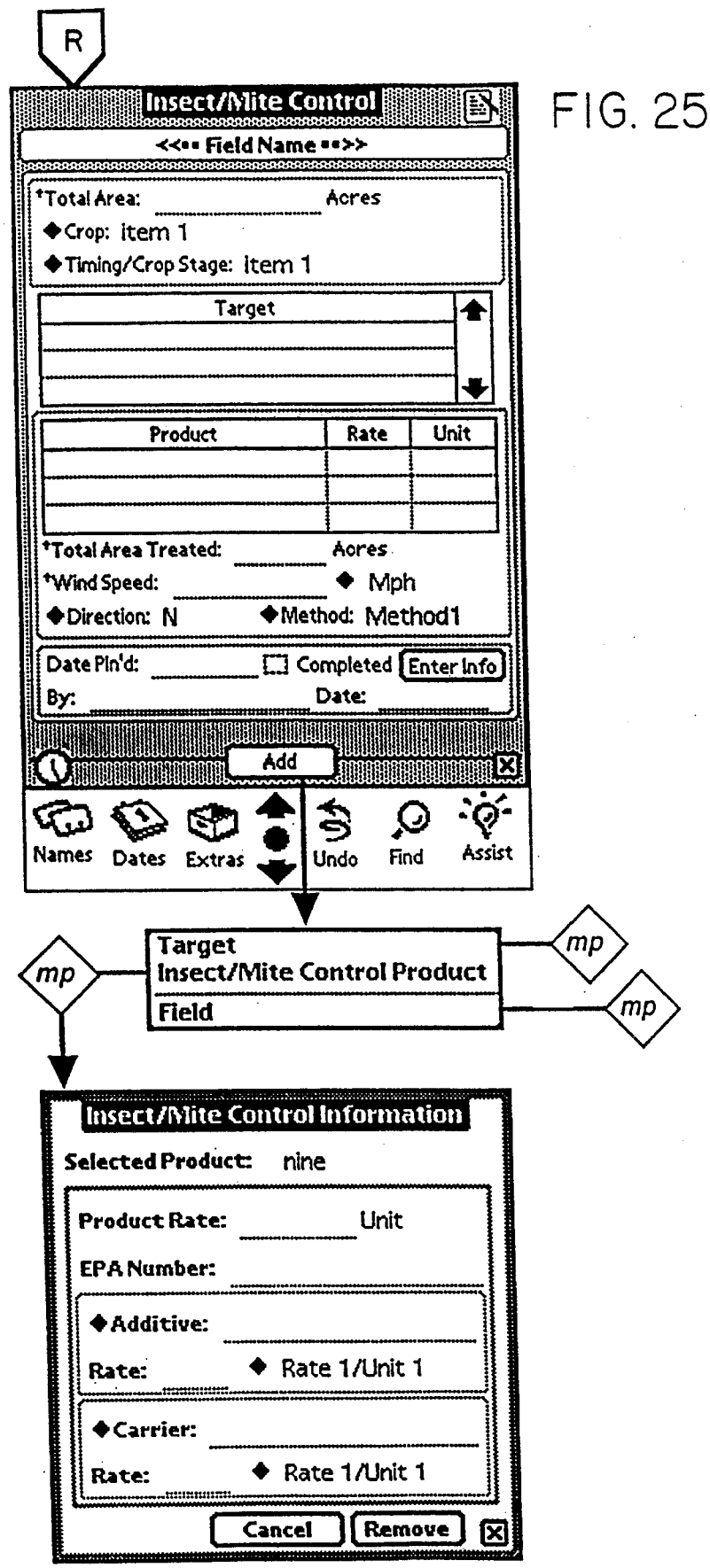
FIG. 25 is a NEWTON® screen and pop-up list with multi-picker function for entering insect/mite control data for a particular field.
Figure 26:
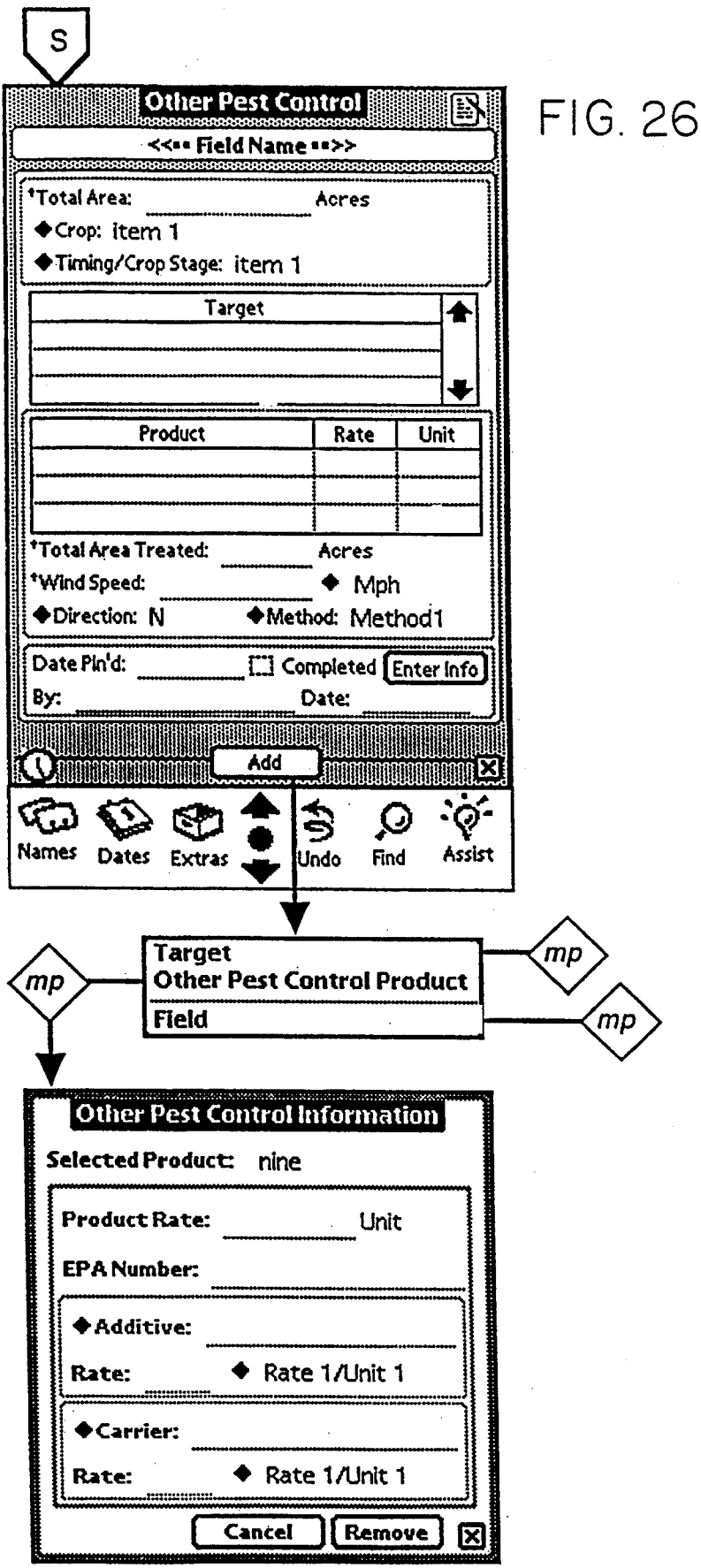
FIG. 26 is a NEWTON® screen and pop-up list with multi-picker function for entering pest control data for a particular field.
Figure 27:
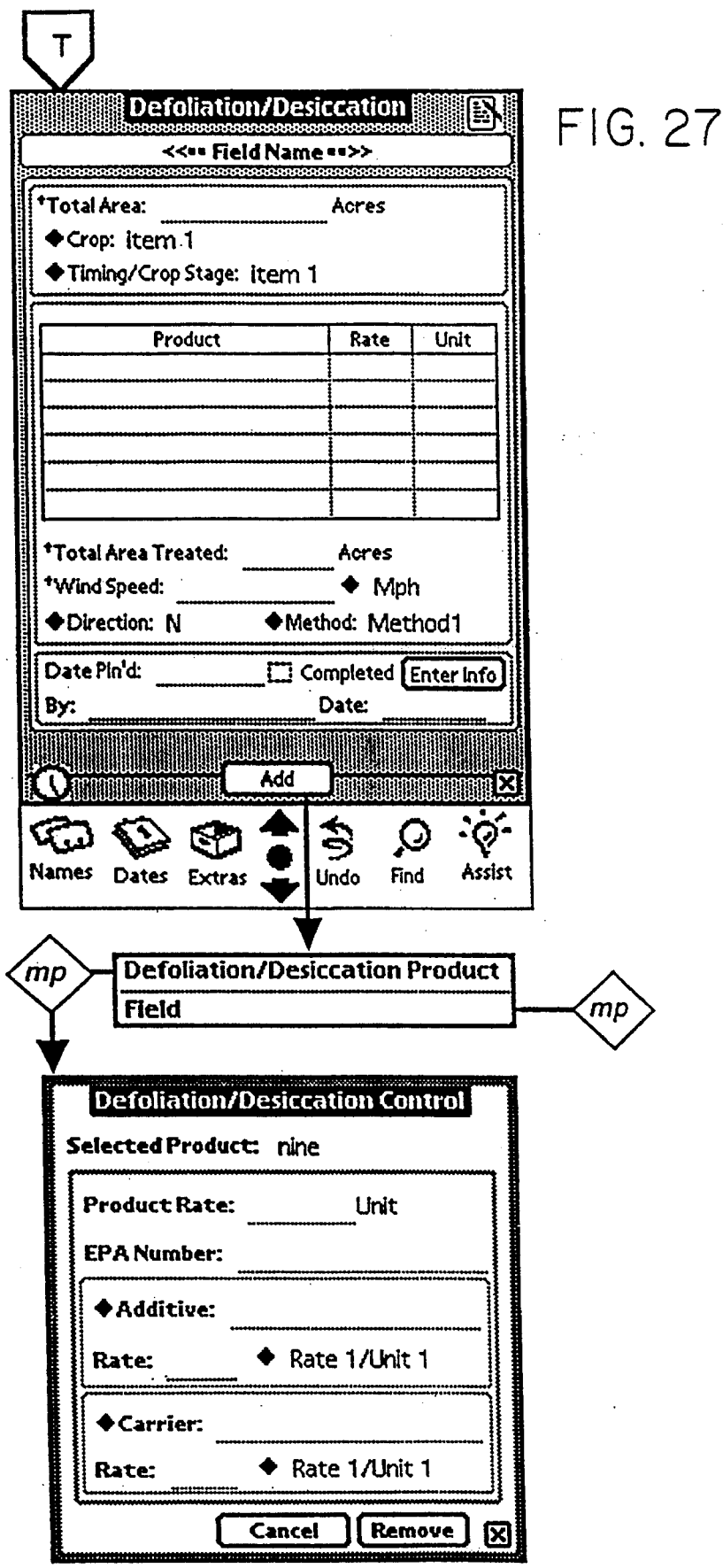
FIG. 27 is a NEWTON® screen with pop-up list and multi-picker function for entering defoliation/desiccation data for a particular field.
Figure 28:
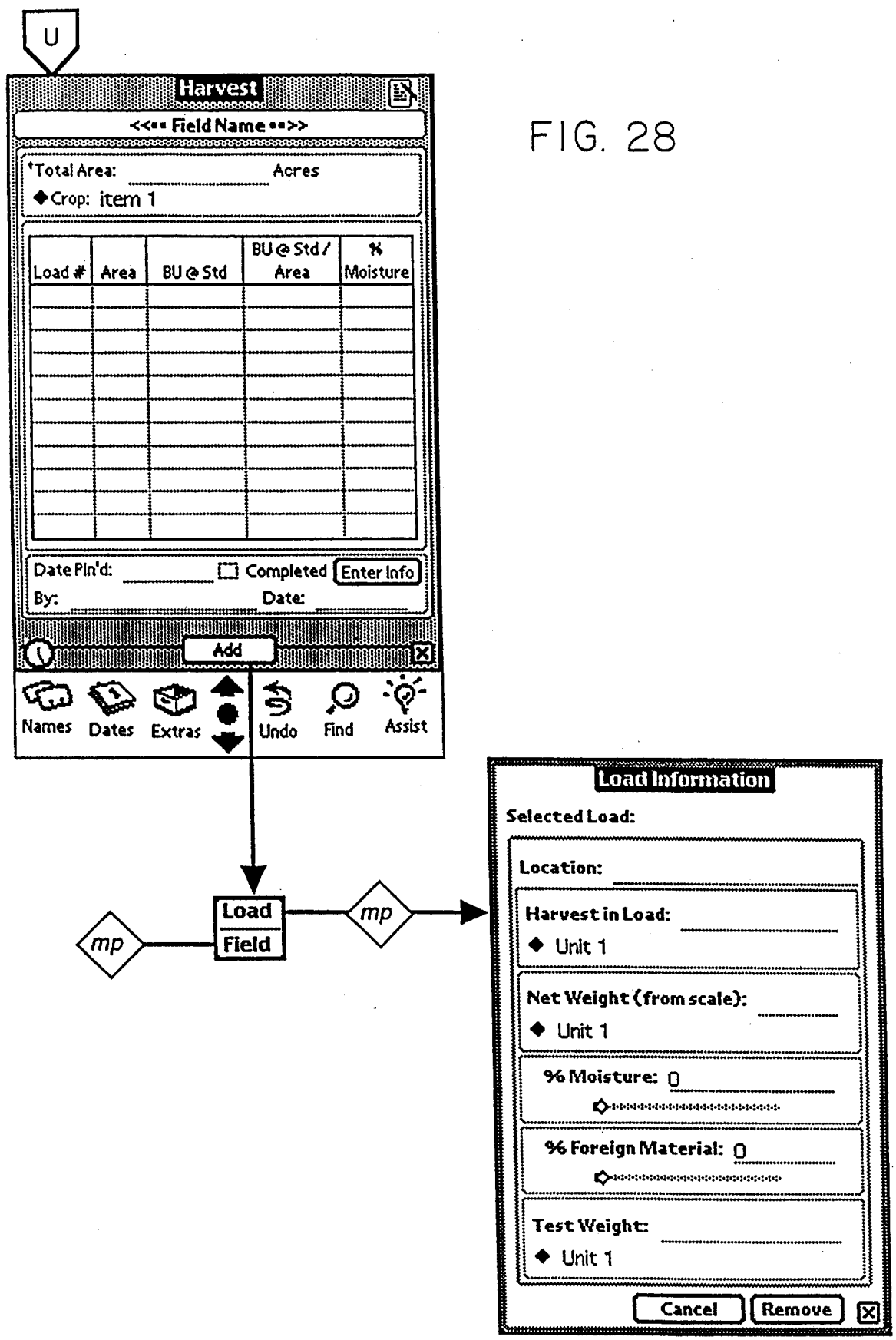
FIG. 28 is a NEWTON® screen with pop-up list and multi-picker function for entering data relating to harvest information for a particular field.

Having explained these program conventions, movement by a user through the nested display program may be more readily understood. As shown in FIG. 4, a field selection may he selected which initially changes the display to the operations summary hy field. These operations may also be displayed by the kind of operation as also shown in FIG. 11, and more detailed information about the field itself may be obtained by tapping the indicated button which moves the display to FIG. 12. As indicated in FIG. 13, various operations may readily added to the displayed page when accessed through the "ADD" button. Furthermore, soil type and crop history information may be added as shown in FIG. 14 by tapping the "ADD" button in the field information display as shown in FIG. 12. In adding the operations, additional detailed information may be added as shown in FIG. 13 which produces one of a number of pop-up displays wherein, for example, the type of tool may be selected with a multi-pick step (FIG. 15) and the field may be selected with a multi-pick step as well, or the crop may be selected (FIG. 16). For plant/seed operations as shown in FIG. 17, the type of seed and other detailed information may be entered through a pop-up screen with a multi-picking step. The other operations may also provide further detailed information as is readily understood by referring to FIG. 15–28.

Figure 29:
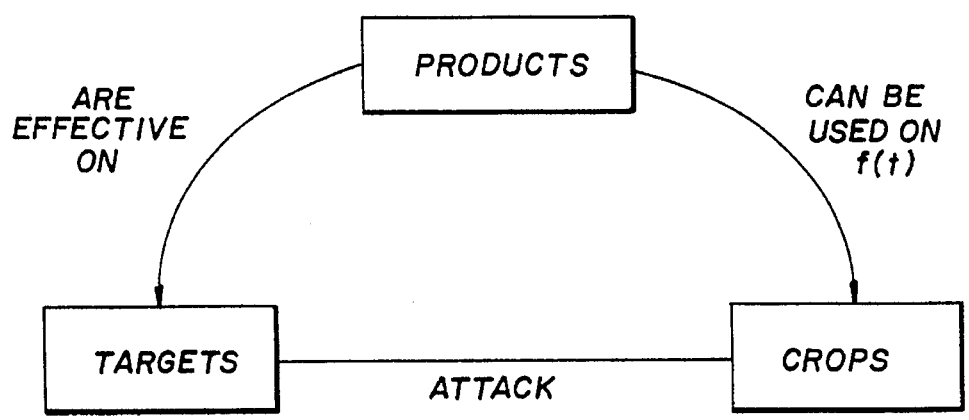
FIG. 29 is a flow chart depicting the logic used in constructing context sensitive lists.

As is apparent from the foregoing, a good many of the displays in this software are utilized to collect data entered by the farmer which relate to agricultural operations on selected fields of his farm. These data are entered through a graphic user interface and without the use of a keyboard through the multi-picking convention as previously explained. The tables which are generated for the multi-picking selections are preloaded into the portable computer memory. However, in order to minimize the available choices in various lists, the software includes a subroutine for generating what are called "context sensitive" pop-up lists which eliminate irrelevant or impossible choices through which a farmer must scroll in order to select an appropriate choice. This Greatly simplifies the farmer's choices in many instances and is an effective tool for minimizing the amount of time required by a farmer to scroll through lists of available choices and make data entry. While the entire software package for the present computer is attached hereto as an exhibit, a "flowchart" of the logic used in eliminating choices for these "context sensitive" scrollable lists is shown in FIG. 29. One such set of data involves products, such as herbicides which a farmer would typically use in all the various farming operations on his crops. This corresponds to the "products" as shown in the figure. Targets are those diseases or infestations which attack the particular crop. Thus, for any particular kind of disease, there are certain products which would be effective thereon and would be selected for display. Also, certain kinds of products are suitable for use during certain growing stages and not others. Thus, depending upon the Growing stage, other products would be selected or eliminated. Using this logic, a pop-up list of herbicides could be paired down based on the crop, point in time of its growing season, and the particular disease or infestation identified by the farmer.

Figure 30:
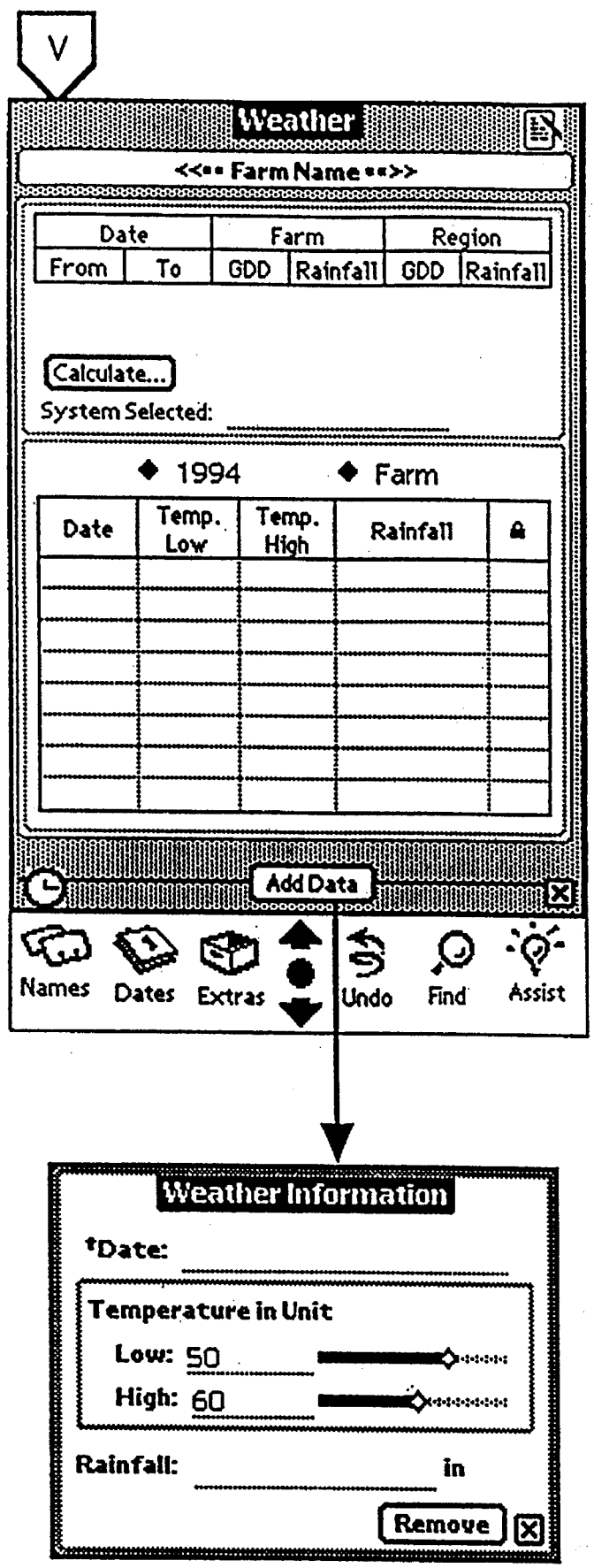
FIG. 30 is a NEWTON® screen and pop-up list for entering data relating to weather for the farm.
Figure 31:
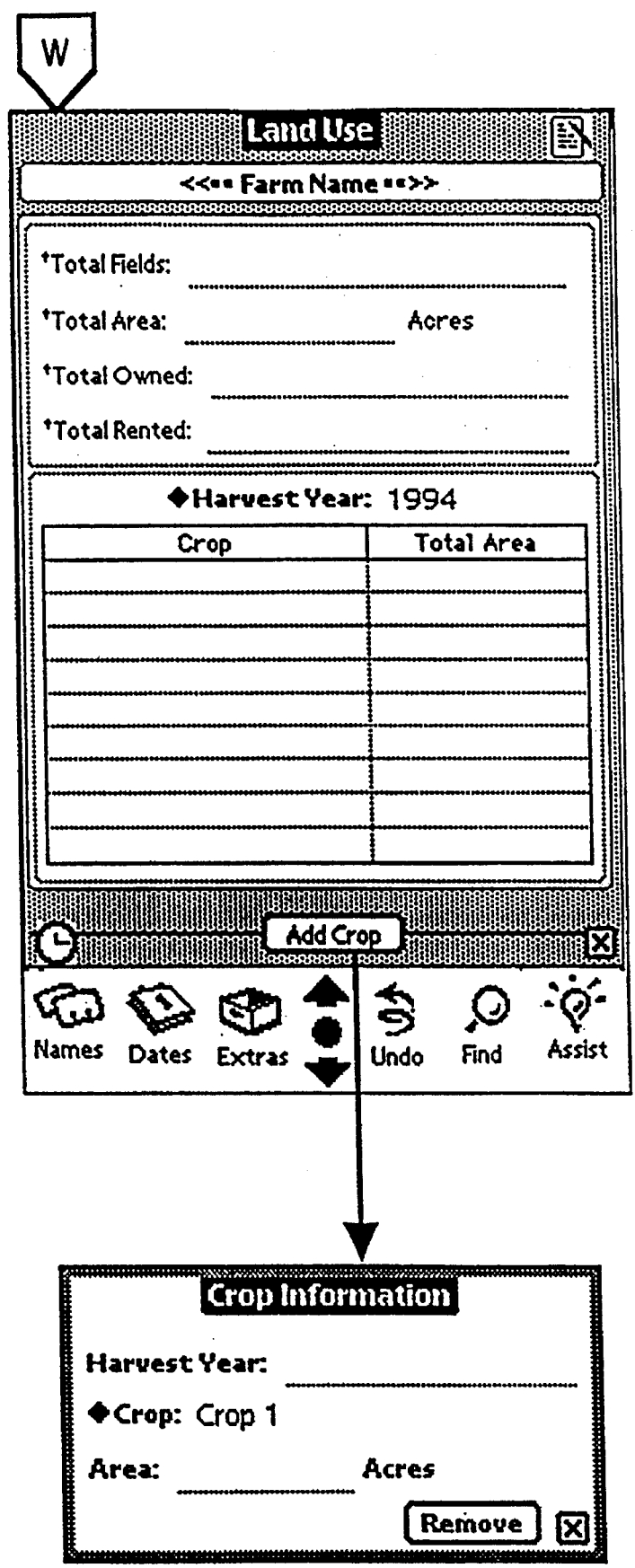
FIG. 31 is a NEWTON® screen and pop-up list for entering crop information for the farm.

In addition to the operations data which may be conveniently input through the nested display arrangement as previously explained, weather information may also be input by a farmer using the display as depicted in FIG. 30. This weather information includes high and low temperature as well as any rainfall. Additionally, a calculation may be made to determine Growing degree days, as indicated. The display shown in FIG. 31 permits entry by a farmer of the various kinds of fields comprising the farm, as well as crop information for each field. Lastly, as shown in the FIG. 32, a summary list may be conveniently assembled of all of the farmer's equipment, with further detail for each piece of equipment as depicted in the pop-up list accessible through the "ADD EQUIP" button. Once added, selection of any line item of equipment will display the same data for reference by the farmer.

The foregoing functional explanation of the nested display program for use on a graphic user interface portable computer has been explained. The source code to execute the program as explained above is attached hereto as Exhibit A. As a further explanation of the nested display logic, a logic diagram showing the display hierarchy with word descriptors is also included herewith as Exhibit B. This information will help further explain the nested display hierarchy in order to further ensure a complete understanding of the present invention. Furthermore, the detailed data which is to be used to populate the various pop-up lists, such as soil type, is detailed in Exhibit C. However, these data would be well known to those of ordinary skill in the art, readily accessible in well known reference materials, and a matter of design choice. It is anticipated that this information will be customized with respect to the particular growing area for which the invention will be provided. Not only is this data well known to those of ordinary skill in the art, but it continues to evolve as new herbicides are developed, new soil typing is determined, new equipment is developed, new seed types are developed, etc. such that the lists which are provided herein are subject to change over time.

In order to enter this information into the mobile computer 20, one of several alternatives may be utilized. As explained above, this information may be entered by a customer service function 22 who may provide a data link connecting the mobile computer 20 with a lap top or other computer brought on site by the representative. Alternately, the information may be downloaded to the farmer's desktop computer 24 through the messaging company 26, or over a data service, and then transferred to the PDA over a data link, such as an RS232 connection. As still another alternative, a PCM card 38 (see FIG. 2) may contain this data and may be inserted into a card slot 40 for a card reader 42 on the mobile computer 20. This is considered to be a matter of design choice for entering base data into the mobile computer 20. Desktop Computer Software The software written and implemented by the inventors as their preferred embodiment is attached hereto as Exhibit D and it closely emulates the nested display arrangement explained above for the portable computer portion of the network. This program is written for operation on a windows platform which provides a graphic user interface, with a mouse instead of a stylus, to provide the same "look and feel" to a farmer for ease in learning and operating the system from either computer. Although the display may be configurable at will under the Windows Operating System, it is anticipated that it will be loaded and recommended for use by a farmer with a representation of the display being used as an image for approximately half the screen. This representation gives the same "look and feel" of an APPLE® NEWTON® display. Also, a series of buttons along the bottom of the initial display will replicate the same functions as explained above for the portable computer, except that two additional buttons will be provided. The first of these will be labeled "SYNC" and shall provide the added functionality of synchronizing the data in the desktop computer with that in the portable computer. Although any of several paradigms may be utilized, the inventors contemplate giving priority to most recent data over older data when comparisons between data entries demonstrate dissimilarities. Typically, it is anticipated that a farmer will take his portable computer in the field and make various entries indicating completed operations, etc. A farmer may then return to his home or base of operations and connect his portable computer through a data link 44, such as an RS232 connection, to his desktop computer 24, and synchronize the data by actuating the "SYNC" button on the desktop computer 24. This synchronization is not only a preliminary step to transmitting data to the central computer 30, but also serves as a backup for the data contained in the portable computer. Of course, this data may then be further backed up by downloading the data base on diskettes, hard disks, etc.

Still another feature of the software for the desktop computer is the ability of the desktop computer to actually manipulate the data contained in the memory of the portable computer. This may be contrasted with other remote access software and data base programs which copy the other computer's data base into the desktop computer for manipulation. With these other prior art software packages, the manipulated data base must then be restored or recopied into the portable computer. This extra step may not only be forgotten, but is also subject to translational error which could result in incorrect entries or differences between the two data bases. This, of course, is very undesirable and especially so as this invention may well be used by operators who do not routinely utilize computers in farming. Additionally, these other prior art packages are written for, and intend to permit, a smaller capacity computer to access a larger capacity computer, which is the opposite of the implementation herein.

The second extra button is labeled "NET" and actuating it leads the user through a simplified routine for transmitting data from the desktop computer to the messaging service. In the preferred embodiment, data is communicated to the system server from the desktop computer in order to implement the invention utilizing existing hardware having commercially available capabilities. However, it is contemplated by the inventors, as is explained above, that communication of data may very well be achieved directly from the portable computer, or either computer, without departing from the scope of this invention.

SYSTEM SERVER SOFTWARE

The inventors contemplate that any commercially available data base software may be utilized for the system server software. One such example is ORACLE™. As is routinely implemented with any typical data base, client specific information, such as farmers' names, may be suppressed and/or deleted from reports such that anonymity of data may be preserved. This may be an important feature in implementing the present invention as farmers generally are reluctant to provide data concerning the operation of their farm unless they can be assured that such data will remain confidential and anonymous. Implementing the client server software appropriately may conveniently ensure this anonymity. Statistical analysis and report generation may be achieved through commercially available software as would be well known to those of ordinary skill in the art. In developing the present invention, the inventors have focused on the user input portion of their invention and do not anticipate that custom software is needed for implementation as presently conceived.

SOFTWARE DESIGN

Figure 33:
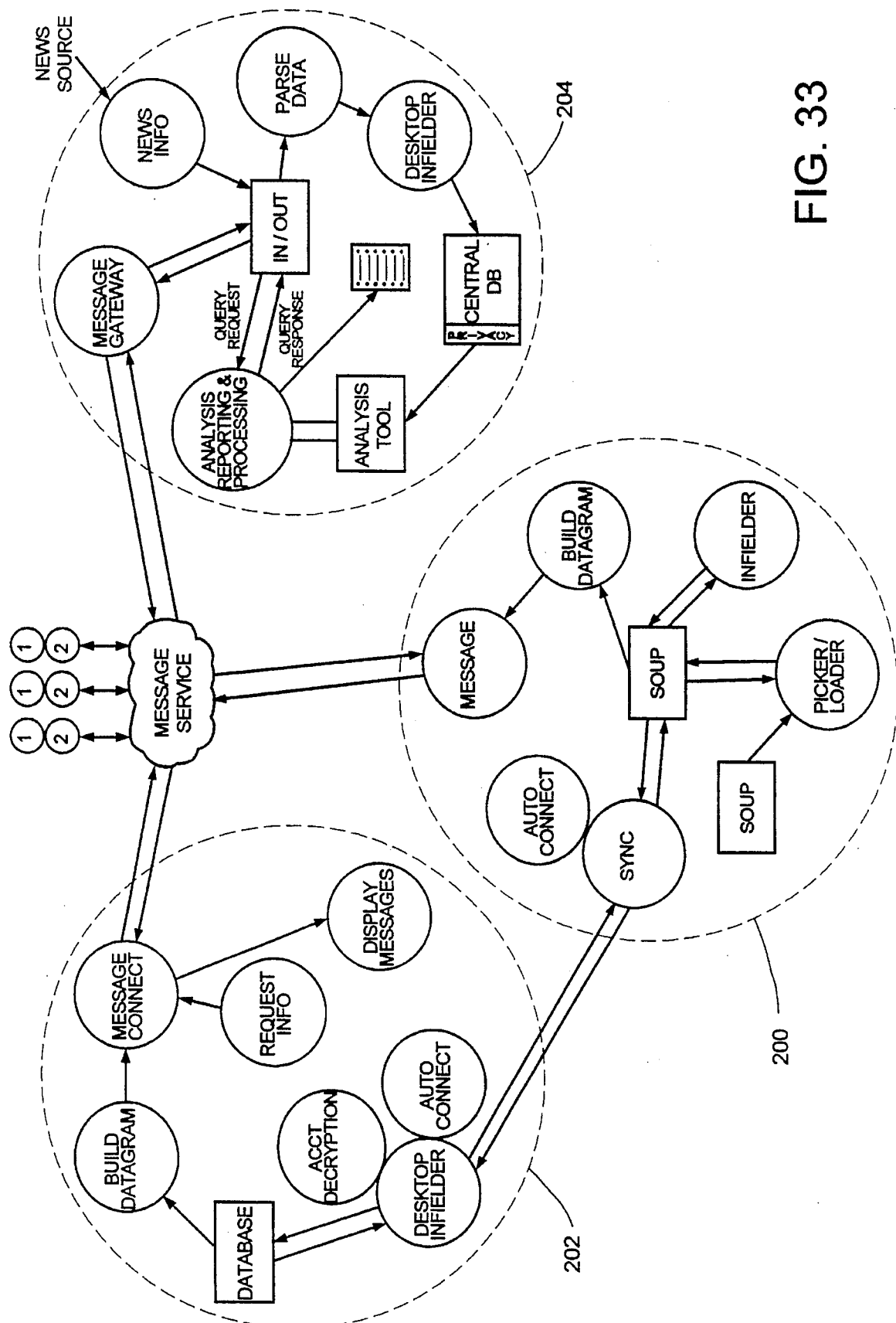
FIG. 33 is a schematic overview detailing the software disclosure and discriminating between source code disclosure and flow chart disclosure.

As shown in FIG. 33, the software design for the present invention is detailed as an aid to one of ordinary skill in the art in implementing the present invention. As shown therein, a dotted line circle 200 represents the software for the mobile computer, a second dotted line circle 202 represents the software for the fixed platform PC, and a third dotted line circle 204 represents the software implemented in the central computer, it being understood that the central computer may itself be comprised of a gateway computer in combination with a central computer, or multiple central computers which provide additional capacity for serving increased numbers of users.

Figure 36:
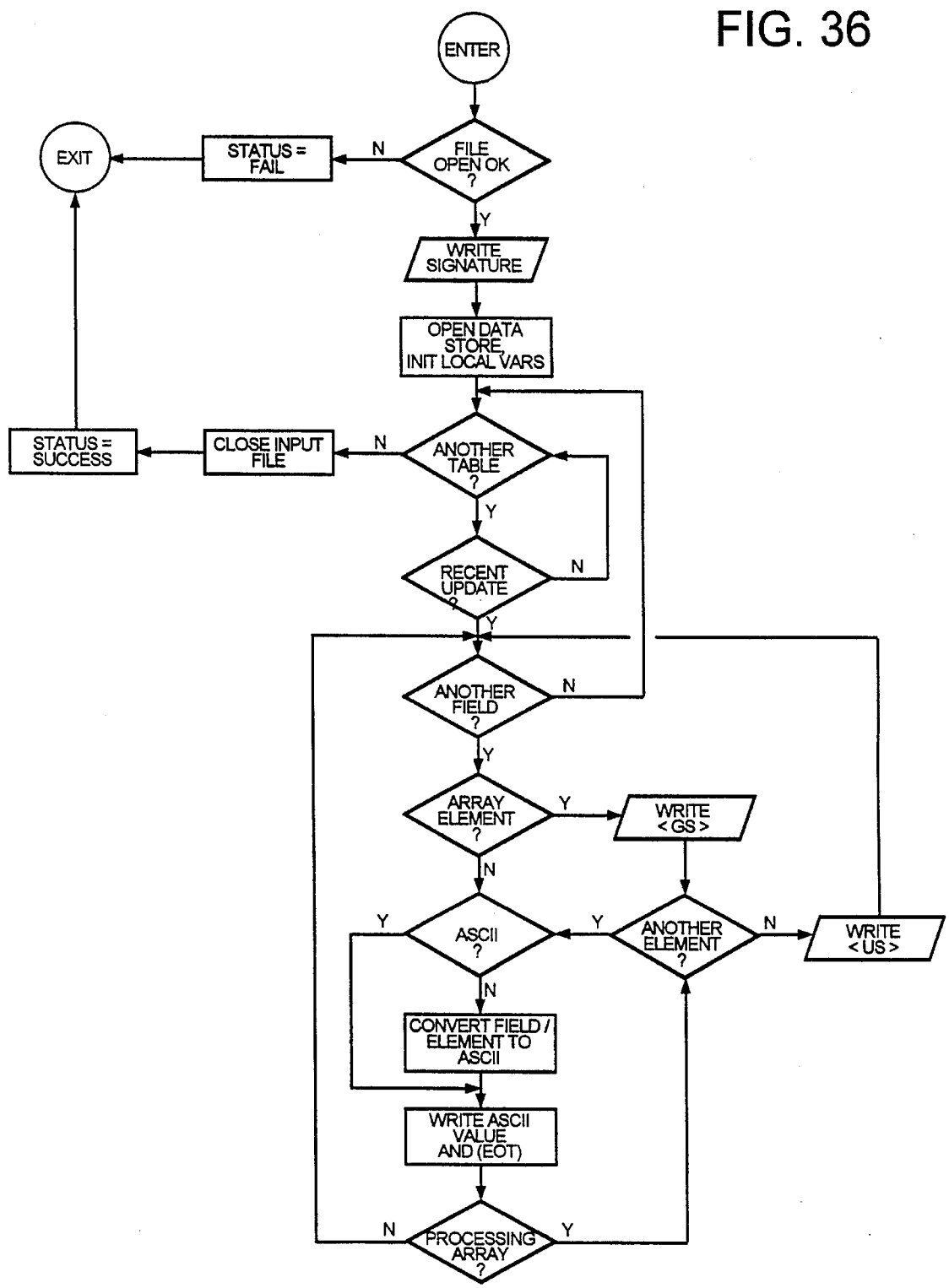
FIG. 36 is a flow chart for a stored program module used in both the portable computer and fixed platform PC for building a datagram from data stored in a data base in stored memory.
Figure 46:
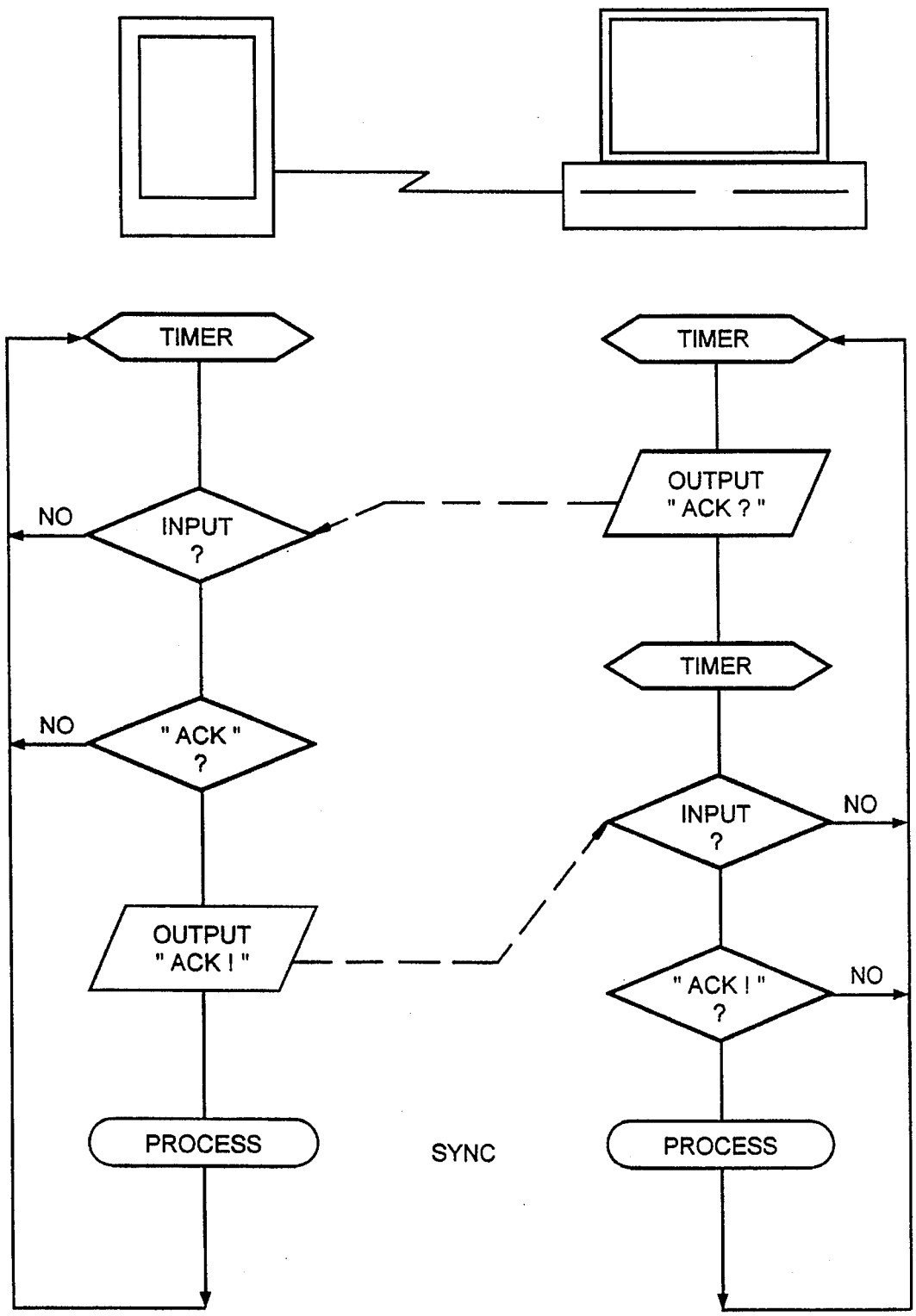
FIG. 46 is a flow chart for a stored program module in both the portable computer and the fixed platform PC for synchronizing data bases upon connection of a data link.

As shown in FIG. 33, many of the functions performed by the software are embedded in the source code being provided as part of the exhibits herein. However, there are several functions which have been implemented through flow charts which are included herein as separate figures of the drawings. These are as follows. As shown in FIG. 34, an overview of the data delivery from the data bases in the mobile computer and fixed platform PC to the central computer data base is detailed. The mobile computer includes program modules which are flow charted as follows. As shown in FIG. 35, the pop-up lists in the mobile computer are populated through a PCMCIA ROM card into an application or RAM card. Data-grams are constructed using the stored program module flow charted in FIG. 36. This program is used both in the mobile computer software 200 as well as the fixed platform PC software 202. As shown in FIG. 46, data synchronization between the mobile computer and the fixed platform PC may be achieved by merely interconnecting the two with a data link.

Figure 38:
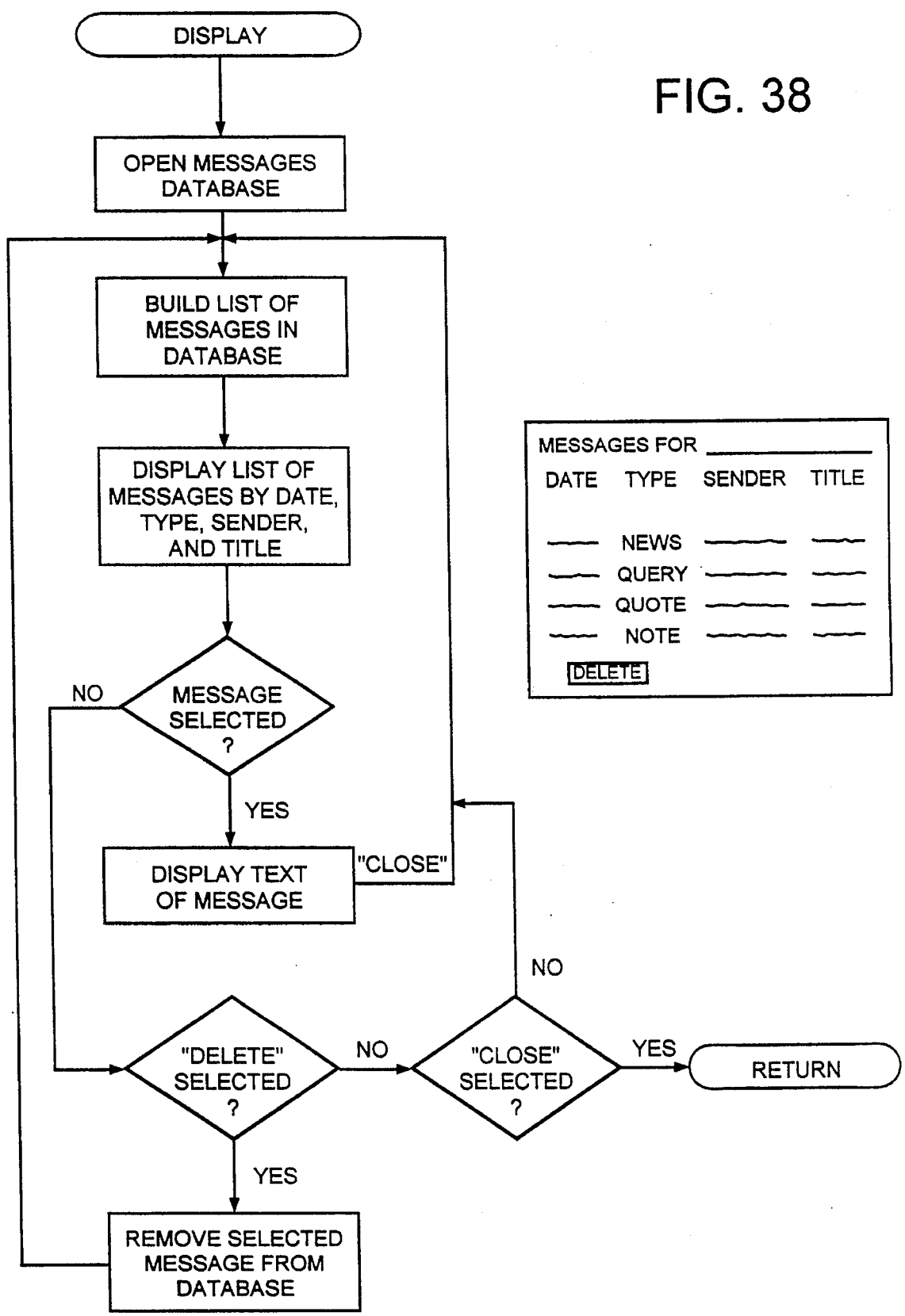
FIG. 38 is a flow chart for a stored program module in the fixed platform PC which enables a user to display messages being communicated through the data link between the fixed platform PC and the central computer.
Figure 39:
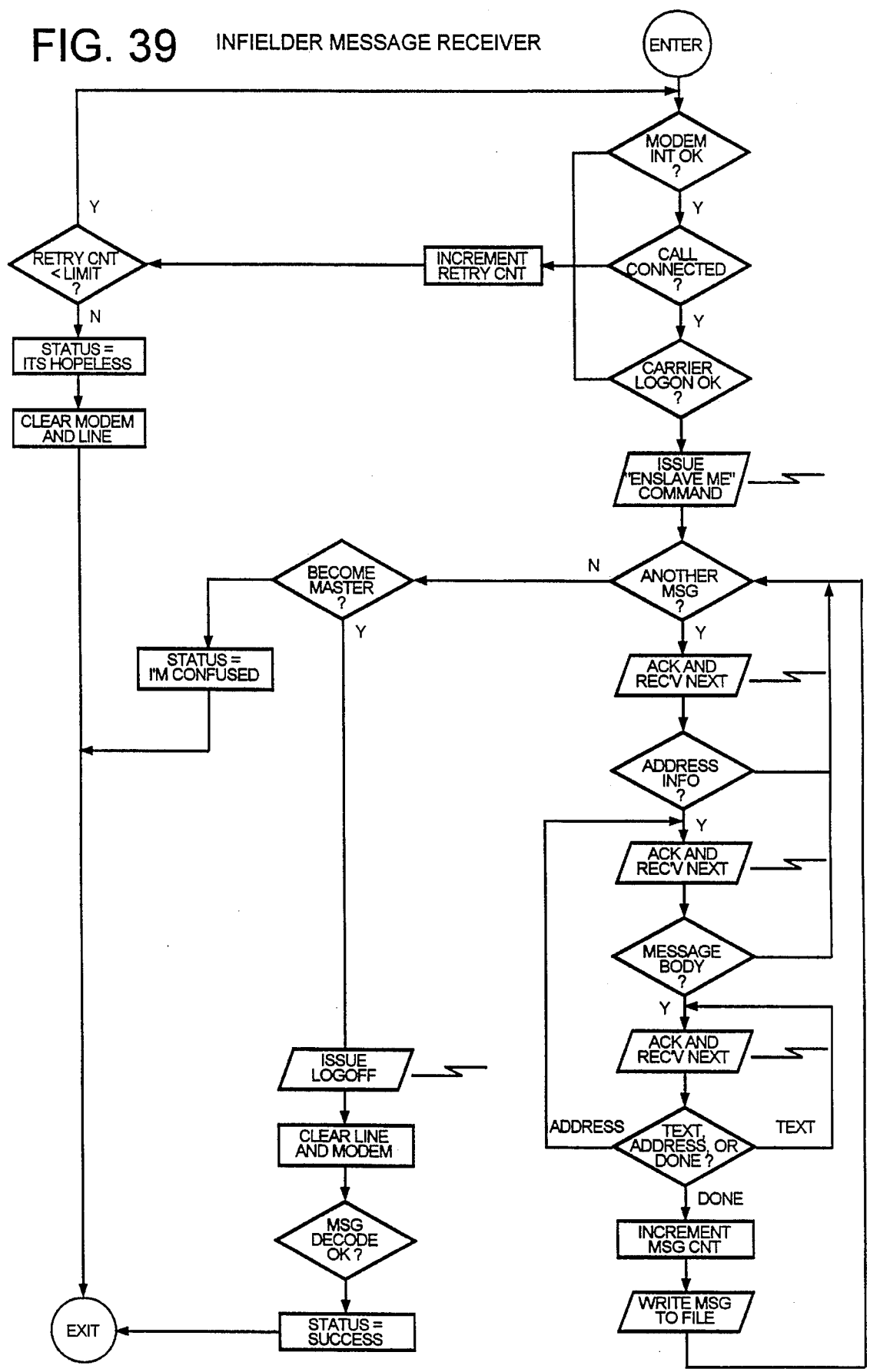
FIG. 39 is a flow chart for a stored program module in the fixed platform PC which facilitates the receiving of messages from the messaging service by the fixed platform PC.
Figure 40:
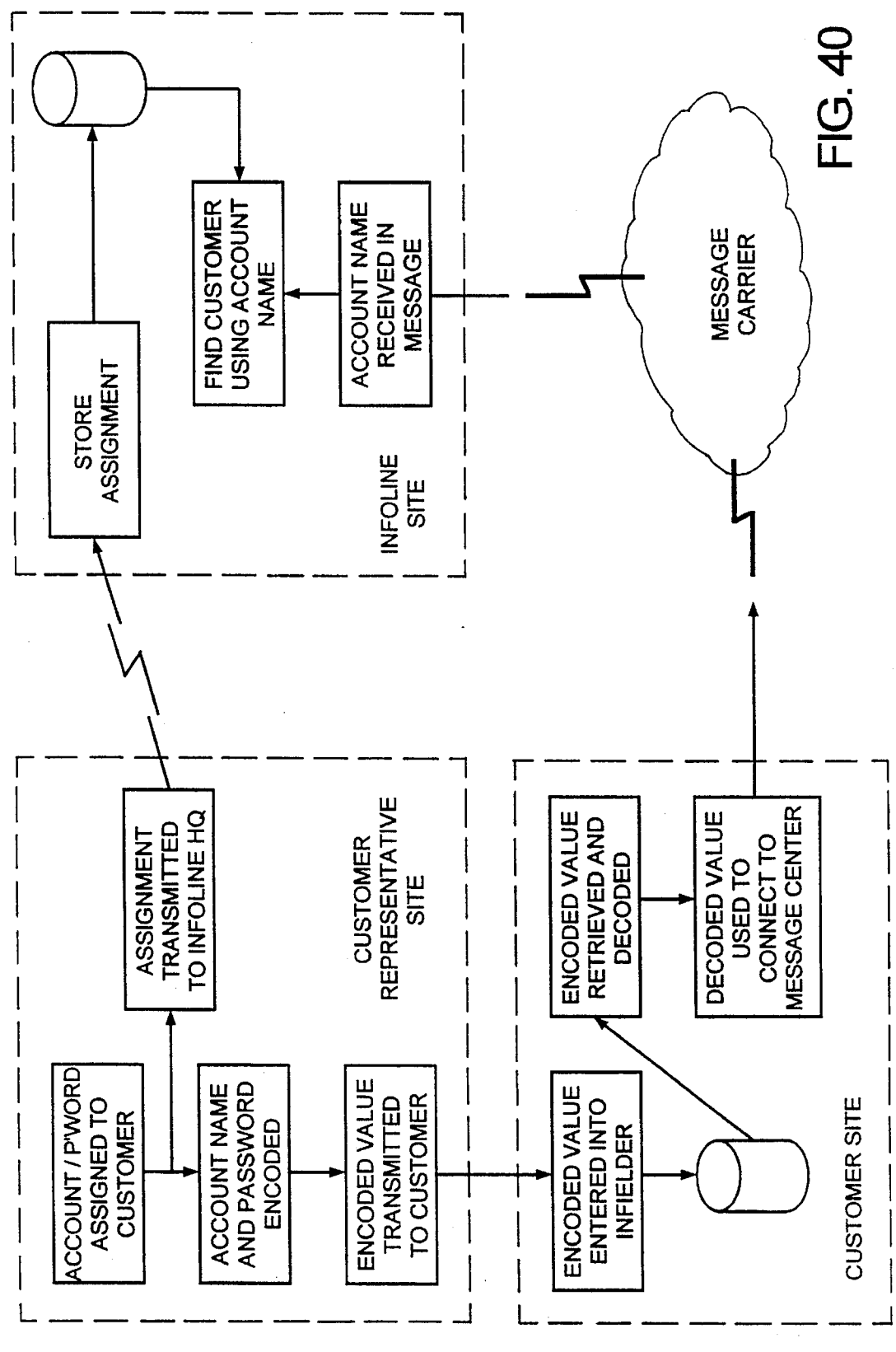
FIG. 40 is a flow chart for a stored program module for the fixed platform PC which provides the coding and decoding of the account number for communication through the messaging service.

The fixed platform PC software 202 includes the "display messages" flow chart of FIG. 38 which permits messages communicated to and from the central computer to be displayed on the fixed platform PC. The capability for the fixed platform PC to receive messages through the messaging service is flow charted in FIG. 39. The coding and decoding of account numbers to prevent misuse of the messaging service by a user is achieved through the stored program module flow charted in FIG. 40.

Figure 37:
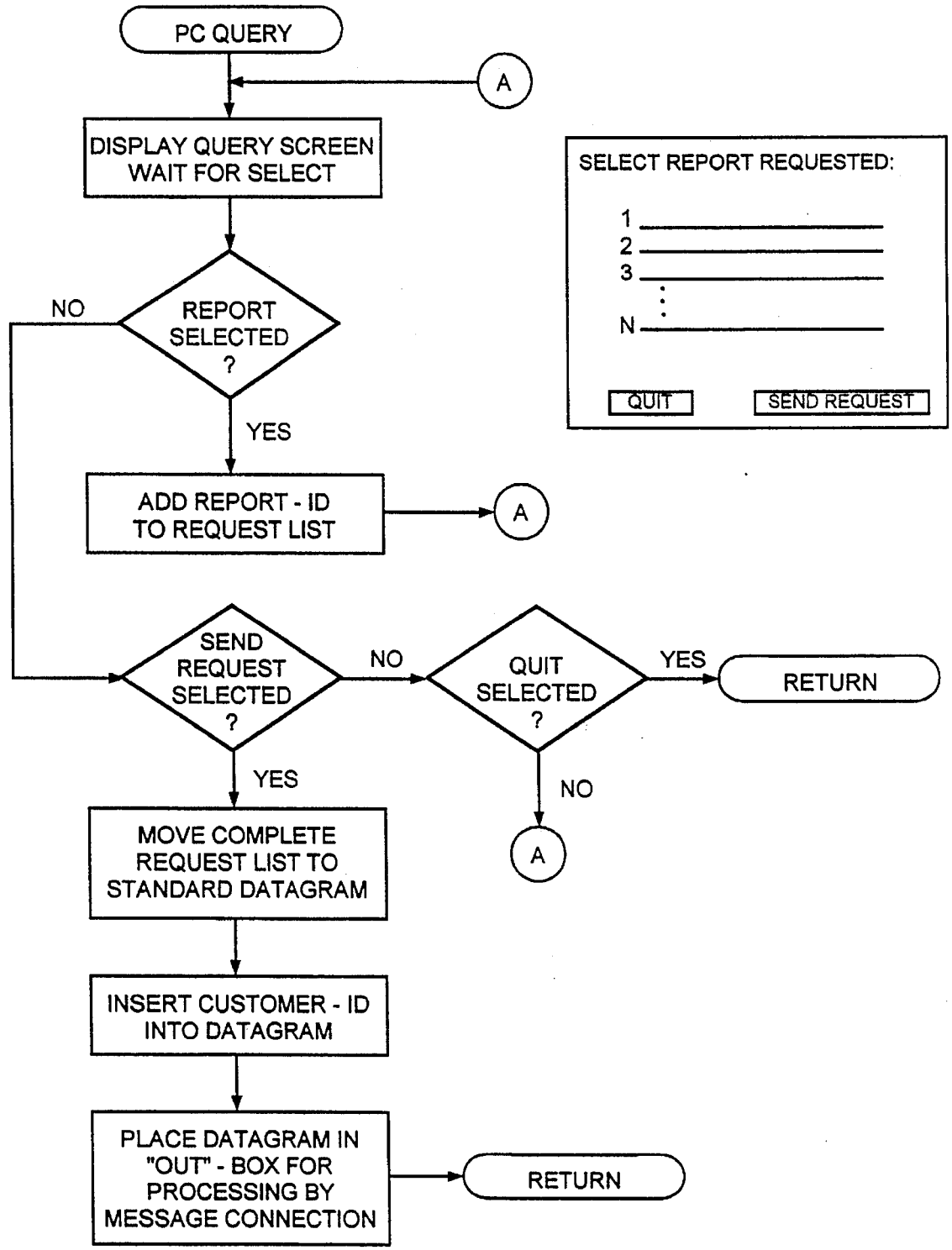
FIG. 37 is a flow chart for a stored program module in the fixed platform PC which facilitates user inquiry for specified reports from the central computer.
Figure 41:
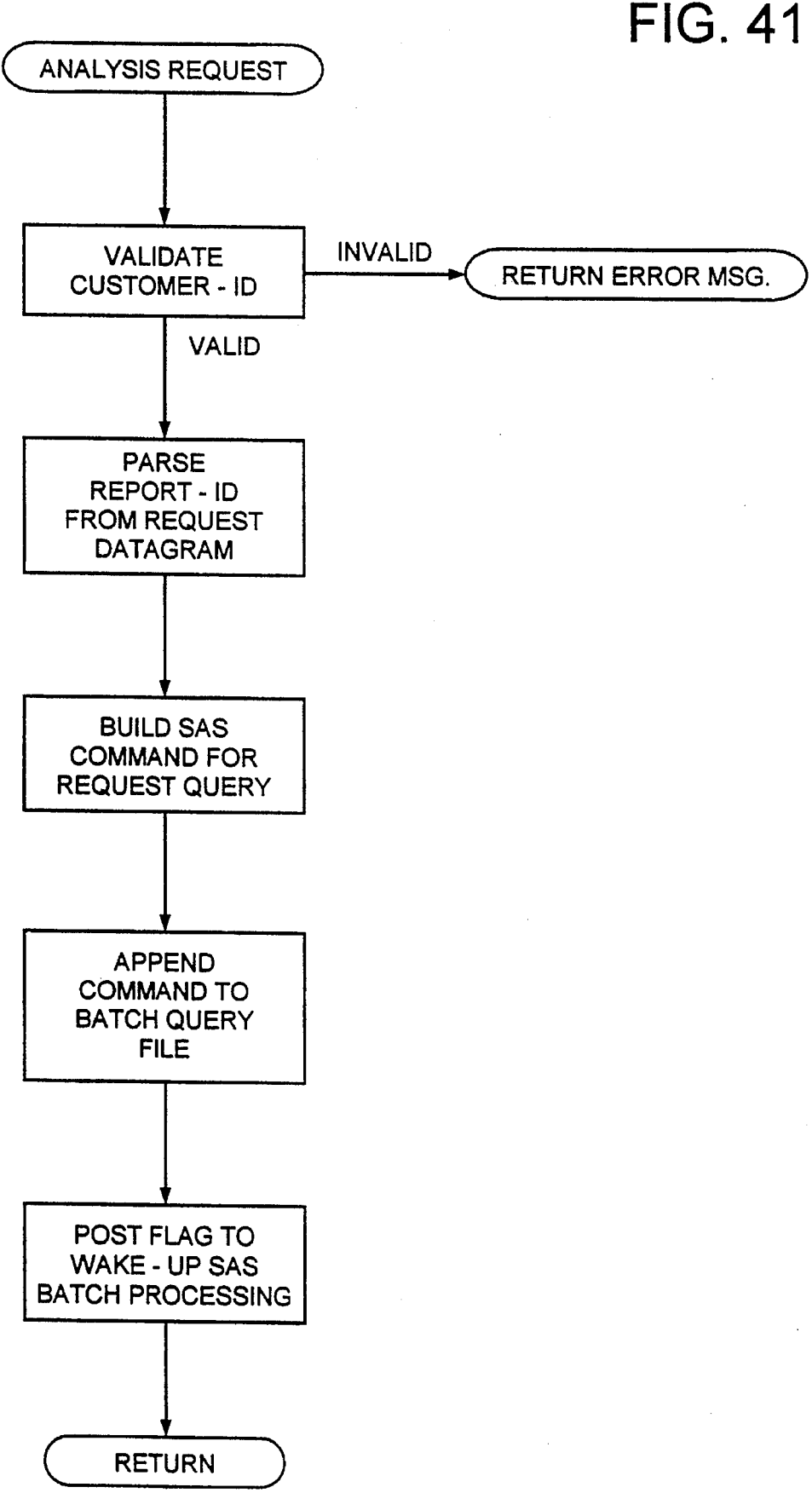
FIG. 41 is a flow chart of a stored program module for the central computer which processes an analysis request from a user for a report or other data.
Figure 42:
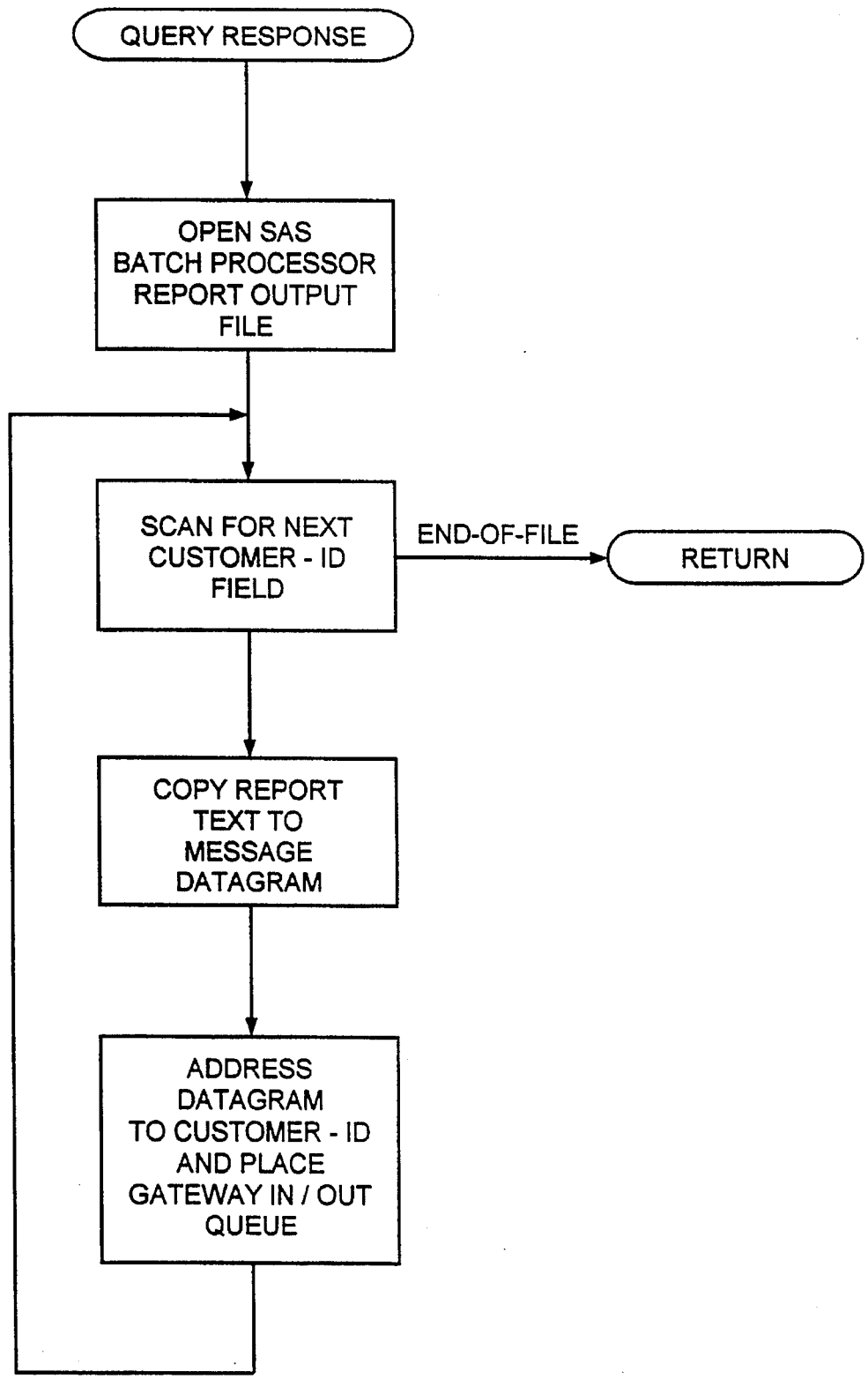
FIG. 42 is a flow chart for a stored program module for the central computer which accesses the central data base and generates a report for transmission to a user on command.
Figure 44:
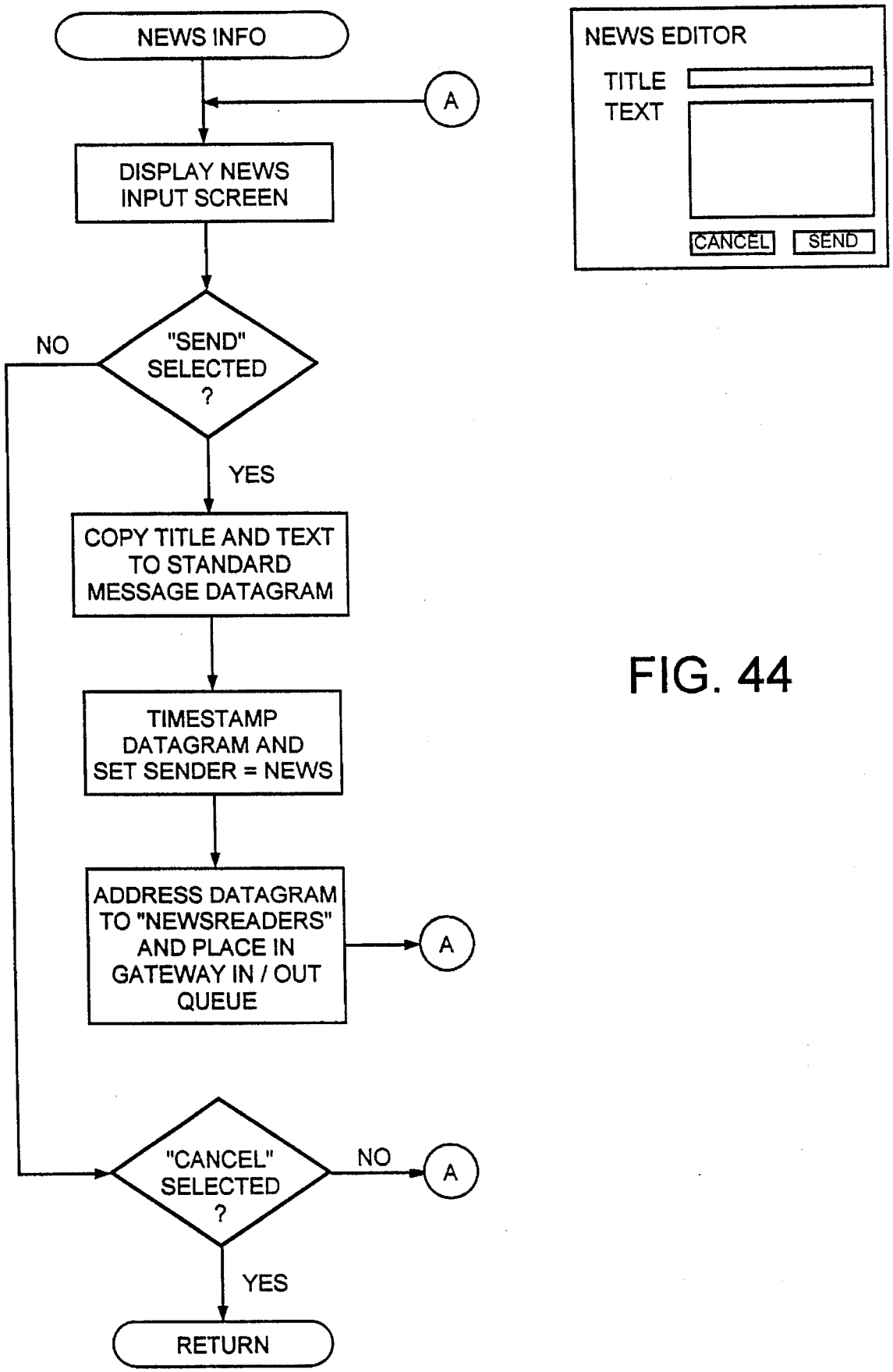
FIG. 44 is a flow chart for a stored program module in the central computer which facilitates operator entry into the central computer of selected information for transmission to users.

The central computer software 204 includes the analysis and reporting program module flow charted in FIG. 37 for handling inquiries from a user and transmitting reports back to him. The preparation of specific analyses based upon customer inquiry is achieved through the central computer software flow charted in FIG. 41. Responding to inquiries is achieved through the software program module flow charted in FIG. 42. The parsing and storing of data from datagrams is achieved through the software program module flow charted in FIG. 43. Additional, offline news or other information may be entered into the system at the central computer through the software program module flow charted in FIG. 44. Privacy of the data contained in the central data base is achieved through the methodology flow charted in FIG. 45.

There are various changes and modifications which may be made to the invention as would be apparent to those skilled in the art. For example, while the present disclosure describes the invention in a farming application where individual farmers are raising crops on their own fields, plantations, orchards, groves, and vineyards, the present invention is readily adaptable and usable for many other "growing" arrangements whether for food or other reasons such as seed crops, ornamentals, etc. These include, but are not limited to, raising cattle in feed lots where the crops are instead herds of cattle and the fields are instead pens; poultry raising operations where chickens are the "crops" and hen houses are the "fields", or similarly for swine or dairy; contract growing arrangements where a major user of "grown" foodstuffs has contracted for the full output of one or more "farms"; and other such situations where it is desired to monitor the growing, raising, breeding or other production of a living organism. However, these changes or modifications are included in the teaching of the disclosure.

What is claimed is:

1. A computer network for gathering data related to the agricultural operation of a farm, said farm having at least one field and an operations base, said network being comprised of a first, mobile computer adapted for being carried in the field and having a graphic user interface to facilitate the entry of data therein, a second fixed platform computer adapted for location at said operations base and configured to emulate the graphic user interface of said first computer so that an operator may conveniently operate both said first and second computers with substantially the same commands, and a first data link for selectively connecting said first and second computers.

2. The computer network of Claim 1 further comprising a plurality of computer pairs, each of said pairs being comprised of a first computer, a second computer, and a first data link for selectively connecting said first and second computers; a third central computer; and a second data link between each of said pairs and said third central computer.

3. The computer network of claim 2 wherein said second data link comprises an offline, batching data link providing communication in both directions between said pairs and said third computer.

4. The computer network of claim 3 wherein each of said first computers includes a memory for storing data relevant to the operation of said farm.

5. The computer network of claim 4 wherein said graphic user interface includes a screen, said first computer being configured for an operator to selectively display said relevant data in any one of a plurality of formats on said screen.

6. The computer network of claim 5 wherein said second computer is configured for manipulating the data stored in said first computer's memory through said first data link.

7. The computer network of claim 6 wherein said second computer includes a memory for storing at least said relevant data stored in said first computer, and is configured for synchronizing said relevant data as stored in said memories.

8. The computer network of claim 7 wherein each of said plurality of second computers is connected to said third central computer through said second data link.

9. The computer network of claim 8 wherein said third central computer is configured for collating and processing the relevant data communicated to it by said plurality of second computers in response to inquiry from any of said plurality of second computers.

10. The computer network of claim 9 Wherein said third central computer is also configured for creating a data base from said relevant data as received from all of said second computers, and for processing the data in said data base.

11. The computer network of claim 10 wherein said second data link comprises a messaging service.

12. A portable, handheld computer for gathering and processing substantially all material data related to the agricultural operation of a farm through an entire growing season, said portable computer having a graphic user interface to facilitate the entry of, processing, and access to said data in said computer, a memory for storing said data, and a stored program to provide the interactive organized visual display of said data in a variety of formats upon operator command, processing of said data in response to operator inquiry including sorting of said data, and recording of operator comments relating to future desired actions to be implemented on said farm.

13. The portable computer of claim 12 wherein said stored program is configured for synchronizing the data stored in said portable computer with the data stored in a second computer with a small number of fixed commands.

14. The portable computer of claim 13 wherein said stored program is configured for synchronizing the data stored in said portable computer with the data stored in a second computer upon connection therebetween with said electronic connection means.

15. The portable computer of claim 14 wherein said stored program is configured for displaying a plurality of nested shell displays on a screen, at least some of said displays including a plurality of data storage lines and a scrollable list from which an appropriate data entry may be selected for entry and display in one of said data storage lines.

16. The portable computer of claim 12 wherein said stored program is configured for populating a plurality of scrollable lists solely with entries which are properly selectable in response to the data already stored in said portable computer.

17. The portable computer of claim 16 further comprising a connector for connecting said portable computer to a second data base, said second data base being adapted for storing a significantly greater amount of data than may be stored in said portable computer memory.

18. The portable computer of claim 17 wherein said stored program is also configured for selectively accessing said second data base on operator command when said portable computer is connected to said second data base to thereby provide additional explanatory data related to any data contained in said stored program.

19. The portable computer of claim 18 wherein said second data base comprises a data card and said connector comprises a data card reader and slot for receiving said data card.

20. The portable computer of claim 19 wherein a substantial portion of said data may be entered in said portable computer by physically touching said data entry as it is displayed on said graphic user interface to thereby provide simplified data entry for an operator.

21. The portable computer of claim 20 further comprising a touch screen sized to cover substantially the entirety of said portable computer's largest side.

22. In a computer network including a plurality of field computers, each of said field computers being adapted for creating a data base reflecting the agricultural operation of a farm, and a single central computer for receiving and assembling data from said field computers into a master data base, the improvement comprising an offline, batching data link interface between said field computers and said central computer to facilitate the orderly transfer of data between said computers.

23. The computer network of claim 22 wherein said central computer is adapted for retrieving messages addressed to it and stored in said data link, and for depositing messages in said data link intended for any of said field computers.

24. The computer network of claim 23 wherein each of said field computers is adapted for checking said data link for messages intended for it, and wherein said data link conditions the release of said messages upon the transmission by said field computer of its data to said data link addressed for said central computer.

25. The computer network of claim 24 wherein said data link is configured for restricting access thereto by any field computer upon the transmission of a valid account number to which a charge is posted for said access, and each of said field computers translates an operator entered code into one of said valid account numbers to thereby restrict said operator's access to said data link.

26. The computer network of claim 25 wherein said batching data link comprises a commercial messaging service.

27. The computer network of claim 26 wherein each of said field computers comprises a portable computer, a base operations computer, and a second data link for selectively connecting and transmitting data between said portable and base operations computers, said base operations computer being connected to said central computer through said batching data link.

28. The computer network of claim 27 wherein said central computer is configured for processing the data in said master data base in response to an inquiry to thereby allow an individual operator of a field computer to have access to provided data from more than just his field computer.

29. The computer network of claim 28 wherein said central computer is configured for guaranteeing the anonymity of data in said master data base as accessed by any field computer.

30. The portable computer of claim 12 wherein said stored program is display driven and includes a first set of displays for recording data on farming operations, a second set of displays for recording data on weather, and a third set of displays for recording data on land use.

31. The portable computer of claim 30 wherein said stored program includes a fourth set of displays for recording data on farm machines.

32. The portable computer of claim 31 wherein each of said sets of displays is further comprised of a plurality of displays which are nested with respect to each other and said graphic user interface is adapted for moving between the nested displays in a set by an operator touching a screen on said portable computer.

33. The portable computer of claim 32 wherein at least one of said displays has at least one button which, when touched, further displays said scrollable list.

34. The portable computer of claim 33 wherein said stored program is configured for populating said scrollable list solely with entries which are properly selectable in response to the data already stored in said portable computer.

35. A client-client-server computer network for collecting and analyzing data related to the agricultural operation of a plurality of farms comprising a plurality of client-client computer sub-networks linked to a central server computer, each of said sub-networks being comprised of a portable computer for use by an operator in a field environment, a base operations computer comprised of a fixed platform PC, and a client data link for interconnecting said portable computer with said PC, each of said sub-networks being associated with a farmer, and a server data link interconnecting each of said sub-networks to said central server computer.

36. The computer network of claim 35 wherein each of said portable computers has a graphic user interface and its associated PC is configured for emulating said graphic user interface to thereby provide a substantially similar interface to an operator on both of said computers.

37. The computer network of claim 36 wherein said server data link comprises an offline, batch data link so that said central server computer may obtain data from said plurality of PCs in batches.

38. The computer network of claim 37 wherein each of said sub-network computers includes a memory for storing said farm data and each of said PCs is configured for synchronizing data stored therein with data stored in its associated portable computer by storing the most recent data entry in any data pair.

39. A portable, handheld computer for gathering substantially all material data related to the agricultural operation of a farm through an entire growing season, said portable computer having a non-command line interface to facilitate the entry of said data into said portable computer, a memory for storing said data, and a stored program to provide the organized visual display of said data, said stored program being display driven and including a first set of displays for recording data on farming operations, a second set of displays for recording data on weather, and a third set of displays for recording data on land use.

40. The portable computer of claim 39 further comprising a connector for connecting said portable computer to a second computer to facilitate the transmission of data therebetween.

41. The portable computer of claim 40 wherein said stored program is configured for having the data stored in said portable computer synchronized with a data set stored in said second computer.

42. A method for collecting and storing data relating to the agricultural operation of a plurality of farms, each of said farms having an associated portable computer and fixed platform computer, comprising the steps of:

recording on each portable computer the data related to its associated farm;

communicating the data from each of said portable computers to its associated computer; and transmitting the data from each of said computers over an offline, batched data link to a central computer.

43. The method of claim 42 further comprising the step of periodically synchronizing the data between each pair of associated portable and fixed platform computers.

44. The method of claim 43 further comprising the steps of:

assembling all of said data into a master data base in said central computer; and analyzing said master base to provide reports for particular farms based on multiple farm data.

45. A computer readable memory for implementation in a field computer to create and maintain a data base of substantially all material data related to the agricultural operation of a farm, said memory being configured for displaying a plurality of sets of nested displays on a display screen of said field computer, and for moving between said sets of nested displays by operator command.

46. The computer readable memory of claim 45 wherein each of said sets of nested displays has an associated icon so that said operator can access one of said sets of nested displays by touching its associated icon on said display screen.

47. The computer readable memory of claim 45 wherein at least one of said nested displays includes a data storage line and a data table from which an appropriate data entry can be selected by said operator for entry and display in said data storage line.

48. The computer readable memory of claim 47 further configured for said data entry to be selected by said operator physically touching said data entry as it is displayed on said display screen.

49. The computer readable memory of claim 48 wherein said data table is scrollable.

50. The computer readable memory of claim 48 further configured for accessing another computer readable memory upon operator command to thereby obtain additional data entries for entry and display in said data storage line.

51. The computer readable memory of claim 48 further configured for populating said data table solely with data entries which are properly selectable in response to data already stored in said memory.

52. The computer readable memory of claim 48 further configured for synchronizing the data stored in said memory with data stored in the computer readable memory of another computer.

53. The computer readable memory of claim 48 further configured for manipulating data stored in the computer readable memory of another computer without copying said data from said another computer.

54. The computer readable memory of claim 48 further configured to display information on less than the full size of said display screen so that the utilized portion of said display screen is substantially the same size as the display screen of a computer associated with said field computer.

55. The computer readable memory of claim 48 further configured for accessing a central computer with a small number of fixed commands.

* * * * *